US008606966B2

(12) United States Patent
Panigrahi et al.

(10) Patent No.: US 8,606,966 B2
(45) Date of Patent: Dec. 10, 2013

(54) NETWORK ADAPTATION OF DIGITAL CONTENT

(75) Inventors: Debashis Panigrahi, La Jolla, CA (US); Sujit Dey, La Jolla, CA (US); Douglas Wong, La Jolla, CA (US); Parag Arole, La Jolla, CA (US)

(73) Assignee: Allot Communications Ltd., Hod-Hasharon (IL)

( * ) Notice: Subject to any disclaimer, the term of this patent is extended or adjusted under 35 U.S.C. 154(b) by 899 days.

(21) Appl. No.: 11/467,897

(22) Filed: Aug. 28, 2006

(65) Prior Publication Data

US 2008/0052414 A1   Feb. 28, 2008

(51) Int. Cl.
*G06F 15/16* (2006.01)

(52) U.S. Cl.
USPC .......................................... 709/246; 709/231

(58) Field of Classification Search
USPC .......................................................... 709/246
See application file for complete search history.

(56) References Cited

U.S. PATENT DOCUMENTS

| | | | |
|---|---|---|---|
| 4,814,883 A | 3/1989 | Perine et al. | |
| 5,764,298 A | 6/1998 | Morrison | |
| 6,014,694 A * | 1/2000 | Aharoni et al. | 709/219 |
| 6,177,931 B1 | 1/2001 | Alexander et al. | |
| 6,363,425 B1 | 3/2002 | Hook et al. | |
| 6,378,035 B1 | 4/2002 | Parry et al. | |
| 6,456,591 B1 | 9/2002 | Mishra | |
| 6,513,162 B1 | 1/2003 | Honda | |
| 6,529,552 B1 | 3/2003 | Tsai et al. | |
| 6,734,898 B2 | 5/2004 | Zeidler | |
| 6,757,796 B1 | 6/2004 | Hofmann | |
| 6,766,376 B2 | 7/2004 | Price | |
| 7,023,488 B2 | 4/2006 | Szybiak et al. | |
| 7,054,911 B1 | 5/2006 | Lango et al. | |
| 2002/0073228 A1 | 6/2002 | Cognet et al. | |
| 2002/0107027 A1 | 8/2002 | O'Neil | |

(Continued)

FOREIGN PATENT DOCUMENTS

| | | |
|---|---|---|
| WO | WO03/065683 A1 | 8/2003 |
| WO | WO03/084172 A1 | 10/2003 |

(Continued)

OTHER PUBLICATIONS

Taylor, Clark N., et al. "V-SHARPER: An Efficient Method of Serving Video Streams Customized for Diverse Wireless Communication Conditions", *IEEE Communications Society, Proceedings of Globecomm 2004* (Nov. 29-Dec. 3, 2004), pp. 4066-4070.

(Continued)

*Primary Examiner* — Firmin Backer
*Assistant Examiner* — Natisha Cox
(74) *Attorney, Agent, or Firm* — Eitan, Mehulal & Sadot

(57) ABSTRACT

A method and system are provided for wireless multimedia customization for different access networks with variable network conditions and device types. In one aspect, when a multimedia content clip is available, the clip is processed for transport by processing it in accordance with different options for the content clip in an optimized way that helps dynamic customization. For example, instead of preparing a version of the entire content clip, targeted for a particular network condition and target device characteristics, or creating a separate processed clip for each compression parameter available, a set of content ingredients are generated that can address a wide range of network conditions even through dynamic fluctuations in conditions and device characteristics.

57 Claims, 15 Drawing Sheets

(56) References Cited

U.S. PATENT DOCUMENTS

| | | | |
|---|---|---|---|
| 2002/0116715 | A1 | 8/2002 | Apostolopoulos |
| 2003/0142670 | A1 | 7/2003 | Gould et al. |
| 2004/0045030 | A1 | 3/2004 | Reynolds et al. |
| 2004/0064573 | A1 | 4/2004 | Leaning et al. |
| 2004/0117427 | A1 | 6/2004 | Allen et al. |
| 2004/0215802 | A1* | 10/2004 | Amini et al. ............ 709/231 |
| 2005/0076099 | A1 | 4/2005 | Wang et al. |
| 2005/0089092 | A1 | 4/2005 | Hashimoto et al. |
| 2005/0123058 | A1* | 6/2005 | Greenbaum et al. ..... 375/240.28 |
| 2005/0135476 | A1* | 6/2005 | Gentric et al. ............ 375/240.1 |
| 2005/0169312 | A1 | 8/2005 | Cakareski et al. |
| 2005/0172028 | A1* | 8/2005 | Nilsson et al. ............ 709/231 |
| 2005/0286149 | A1 | 12/2005 | Haswell |
| 2006/0005029 | A1* | 1/2006 | Petrovic et al. ............ 713/176 |
| 2006/0136597 | A1 | 6/2006 | Shabtai et al. |
| 2006/0218169 | A1 | 9/2006 | Steinberg et al. |
| 2006/0280252 | A1 | 12/2006 | Kwon et al. |
| 2007/0094583 | A1* | 4/2007 | Randall et al. ............ 715/500.1 |
| 2008/0126812 | A1* | 5/2008 | Ahmed et al. ............ 713/189 |

FOREIGN PATENT DOCUMENTS

| | | | |
|---|---|---|---|
| WO | WO2006/029068 | A2 | 3/2006 |
| WO | WO2006/055768 | A2 | 5/2006 |
| WO | WO2006/055769 | A2 | 5/2006 |

OTHER PUBLICATIONS

Taylor, Clark N., et al. "Run-time Allocation of Buffer Resources for Maximizing Video Clip Quality in a Wireless Last-Hop System", (Communications, 2004 IEEE International Conference on Paris, France Jun. 20-24, 2004), *IEEE* (2004) 5:3081-3085.

Turaga, D.S., et al. "Adaptive Live Streaming Over Enterprise Networks", Multimedia and Expo, 2005, ICME 2005. *IEEE International Conference on Amsterdam*, The Netherlands, Jul. 6, 2005, p. 974-979.

Amini, L., et al. "ARMS: Adaptive Rich Media Secure Streaming", *Proceedings of the ACM International Multimedia Conference and Exhibition; 2003 Multimedia Conference—Proceedings of the 11th ACM International Conference on Multimedia* (2003) pp. 86-87.

Ozcelebi, T., et al. "Minimum Delay Content Adaptive Video Streaming over Variable Bitrate Channels with a Novel Stream Switching Solution", *IEEE International Conference on Genova*, Italy, Sep. 11-14, 2005, vol. 1:209-212.

Chen, Songqing, et al. "Segment-Based Proxy Caching for Internet Streaming Media Delivery", *IEEE MultiMedia*, Jul.-Sep. 2005, pp. 59-67.

Cranor, Charles D., et al. "Enhanced Streaming Services in a Content Distribution Network", *IEEE Internet Computing*, Jul.-Aug. 2001, pp. 66-75.

Guo, Lei, et al. "DISC: Dynamic Interleaved Segment Caching for Interactive Streaming", *Proceedings of the 25th IEEE International Conference on Distributed Computing Systems* (ICSCS'05) (2005) pp. 1-10.

Taylor, Clark N., et al. "V-Shaper: An Efficient Method of Serving Video Streams Customized for Diverse Wireless Communication Conditions", *IEEE Communications Society, Proceedings of Globecomm 2004* (Nov. 29-Dec. 3, 2004), pp. 4066-4070.

Dalziel, Stuart, "Record Linear Time Code Date," Feb. 1996, Retrieved from the internet in Jun. 2009, <http://www.damtp.cam.ac.uk/lab/digimage/hlpfiles/vs@2.htm>, p. 1-2.

Hong, James W., "A Generic Paradigm for Efficient Distributed Communication," Jul. 1991, University of Waterloo, pp. 1-19.

Moshnyaga, Vasily G., "An Implementation of Data Reusable MPEG Video Coding Scheme," 2005, World Academy of Science, pp. 1-4.

International Search Report dated Apr. 18, 2008 for PCT/US2007/080989, 2 pages.

\* cited by examiner

FIG. 12

NETWORK ADAPTATION OF DIGITAL CONTENT

BACKGROUND

With the increasing popularity of multimedia content, the need to access such content has increased rapidly, using any type of device and any type of access network. Different types of network access technologies have a wide range of network availability. For example, while network bandwidth available in a GPRS network ranges from 9.6 kbs to 144 kbps, the bandwidth available for 1×EV-DO is in the range of 1 Mbps. Additionally, the network condition changes dynamically for some of the network access technologies, such as wireless networks including WLAN, WiMaX, GPRS, EDGE, and the like. Thus, the available bandwidth for a given network access technology can vary over the duration of a communication session with a receiving device. Similarly, different receiving devices have different resource availability characteristics that can impact the delivery of digital content to all devices. Based on the above demands, there is a critical need to optimize the delivery of multimedia content in order to provide acceptable quality of service and efficient delivery to all devices and over all network access technologies given the available network bandwidth.

Wireless network connections can be especially challenging for delivery of multimedia content. Current real-time video delivery services on the Internet (e.g., Real Networks, Windows Media) have made some attempts at reducing the bandwidth required for delivering video and multimedia content, and adjusting the delivery of content according to the available bandwidth of wireless networks. These approaches, however, do not consider some properties of wireless networks, such as noise over wireless channels, that can significantly impact the received video quality. That is, although such approaches may reduce the delivery bandwidth required, they do not account for quality of the received transmission and cannot generally accommodate the typically noisy and unreliable wireless data network connections encountered by many devices.

Some currently employed techniques to address fluctuations in available bandwidth involve preparing multiple versions of the same content, targeting different network conditions, and switching between the versions based on current network bandwidth availability. Such techniques generally require generating and storing all possible versions for each frame of the multimedia content. Therefore, such techniques require greater processing and storage resources, and are not scalable to address the wide fluctuations of network bandwidth that can be observed in different network access technologies, such as 1×EV-DO.

Other proposed techniques provide customization to the bandwidth and error conditions of wireless channels, which can improve the quality of the received content. Such techniques, however, generally have two primary weaknesses. First, they require compression of the video at the time of transport, which generally leads to a high implementation cost. Second, these methods typically require a specialized video player to be installed on the client, at the receiving device.

Other currently available techniques select the multimedia content clip as a whole, so that all aspects of delivering multimedia content are fixed over the duration of an entire communication session or content clip. Such holistic static techniques cannot account for variations in available bandwidth during the time the content is received. Thus, such techniques cannot provide multimedia streams at the finer granularity needed to accommodate the multitude of available network access technologies and their associated variations.

SUMMARY

Embodiments of the present invention provide a method and system for content customization for access networks with variable network conditions and device types. In one aspect, a content clip is processed in accordance with different options for the content clip so as to assist in a subsequent dynamic customization operation. For example, instead of preparing a version of the entire content clip that is targeted for a particular network condition and for particular target device characteristics, and instead of creating a separate processed clip for all values of each compression parameter available, embodiments of the present invention generate a limited set of content ingredients that can address a wide range of network conditions, even through dynamic fluctuations in conditions and device characteristics. A customization operation at the time of network transport can select from among the generated content ingredients, in response to current network conditions, to provide more efficient network transport of a clip with best results at a particular receiving device.

In accordance with the present invention, a source content clip having multiple constituent tracks of information is processed so that each constituent track is processed independently, and operations to be performed for each track can be independently selected. For example, a multimedia clip having tracks comprising video frames and audio data can be processed such that selection of video frame types, frame rates, and video compression levels can be selected independently of audio encoding operations. The processed content clip will then include multiple versions of the tracks, compressed prepped content, and can be stored at a location with network access. Thus, rather than create processed versions of the clip that include every possible combination and permutation of permitted operations, information about system resources such as processing abilities and receiving device characteristics, and target metrics for delivery, are used to determine which available operations will be performed on the source content clip. This reduces the resources necessary to prepare and store the processed tracks of the content clips.

An optimal combination of the processed tracks for the clip (the prepped content) can be selected at transport time in accordance with current network conditions for efficient transport and to maximize the quality-of-service experienced at the receiving device. In this way, when the processed content is to be provided to a receiving device across the network, the constituent processed tracks can be selected and composed into a completed clip at the time of transport such that desired quality-of-service parameters can be satisfied while best utilizing the network resources available.

In addition, the available network resources can be intelligently allocated among the tracks so as to maximize the overall quality of the received multimedia content. For example, with a multimedia clip, the tracks comprising video frames and audio can be separately combined or shaped dynamically for the current bandwidth and error conditions of a wireless channel, so the shaped multimedia clip does not require any new software/codec/player to be installed in the receiving device. This improves the quality of multimedia transport under varying network conditions by dynamic customization of the constituent tracks for network transport of the processed digital content.

When a request is received from a receiving device for a content clip, the network condition is monitored and estimated. Based on the network availability and the number of constituent tracks to be delivered for each session, the available network resources are allocated to each of the constituent tracks of the clip. Next, dynamic selection schemes are used to compose the processed track from the available content within the limits of the allocated network resource to produce a customized content clip. Finally, the customized clip with processed tracks is provided for network transport and delivery to the receiving device.

Other features and advantages of the present invention should be apparent from the following description of exemplary embodiments, which illustrate, by way of example, aspects of the invention.

BRIEF DESCRIPTION OF THE DRAWINGS

FIG. 12 is a diagrammatic representation of video processing operations for video track compression.

DETAILED DESCRIPTION

Figure 1:
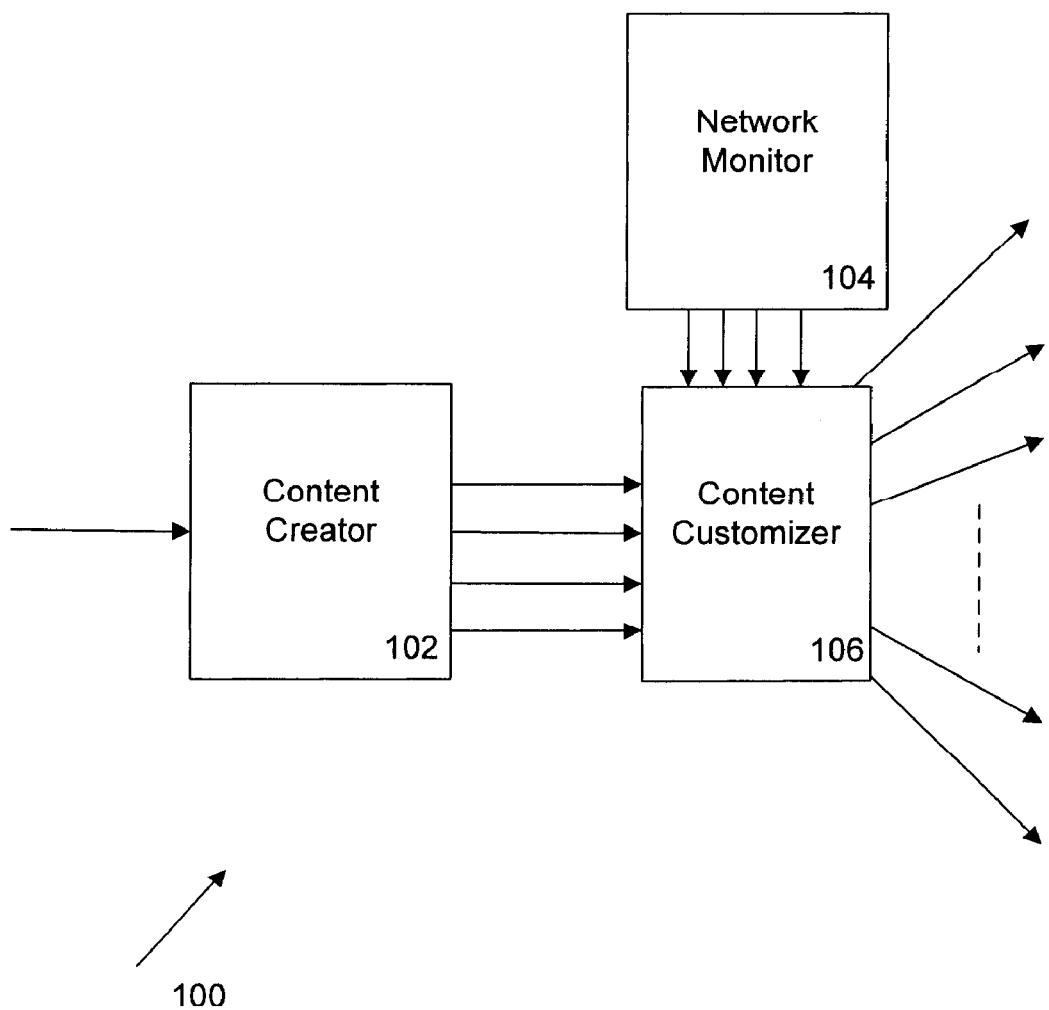
FIG. 1 is a high-level functional block diagram of a processing system constructed in accordance with the present invention, illustrating the data flow in the system.

A high level functional diagram of a processing system 100 constructed in accordance with the present invention is shown in FIG. 1. In the presented system 100, the processing and preparation of the content and the customization of the content to fit to different network/device conditions are independently achieved, or orthogonalized, in an optimal way so as to be able to generate customized streams of data without having to store a large number of pre-prepared streams. For example, in a conventional system, to handle network conditions varying between 10 kbs to 200 kbp bandwidth and a frame error rate (FER) between $10^{-1}$ and $10^{-4}$ (measured as erroneous frames/total frames), the number of streams required to be stored can be as high as 800 streams, assuming the bandwidth fluctuates in 5 kbps steps and the range of packet drop has twenty steps within the FER range specified above. In accordance with the present invention, rather than storing 800 streams and dynamically choosing the closest stream based on the network condition, the present techniques process content clips to generate major components or ingredients that are used dynamically to compose customized streams for a wide variety of network conditions and device characteristics. In this way, a stream of data can be composed dynamically for particular network conditions for sending to particular receiving devices. For the example cited above, it is sufficient to store twenty streams in the presented methodology and perform dynamic adaptation to match network conditions.

FIG. 1 shows that the functionality of the system 100 is partitioned into three modules, illustrated as Content Creator 102, Network Monitor 104, and Content Customizer 106. The Content Creator receives data for network transport, referred to herein as a clip (such as a multimedia clip comprising multiple constituent data types or tracks that are rendered together at a receiving device for presentation). The goal of the Content Creator module 102 is to generate processed components or ingredients from the input content (i.e., the clip) from which a suitable stream can be fashioned for network transport. The Network Monitor module 104 provides feedback to the system about the current network condition between the system and the destination receiving device. The Content Customizer module 106 generates customized streams of the components dynamically from the processed ingredients to efficiently utilize the network availability.

In the system, the content clip can be processed by the Content Creator 102, and then the processed clip can be composed, or adapted, by the Content Customizer 106 for the current network conditions, and then transported across the network to a receiving device. The processing of the original input clip can be performed by the Content Creator independently of current network conditions. From the processed constituent tracks, a combination can be selected at runtime in response to current network conditions, for more efficient transport across the network to a receiving device. The selected combination comprises a content clip that is adapted for the network conditions to the receiving device at the time of network transport. The selection of the combined tracks can be performed by the Content Customizer 106, as described further below. The network transport operation can be performed as a streaming content delivery to a receiving device or as a file transfer (download or progressive download) to the receiving device for later viewing.

Thus, the system 100 implements a two-step process in which the Content Creator 102 processes content clips to create ingredients or streams of processed clips from which the Content Customizer 106 will select and choose for optimal rendering results at the receiving device for the network conditions from the Network Monitor 104 at the time of network transport. It is not necessary for the Content Creator 102 to prepare processed clips that encompass every possible combination and permutation of possible compression parameters, bitrate values, frame rates, and the like. Rather, the Content Creator can intelligently process the source digital content clips by considering target parameters for a selected network and Quality of Service, system resource availability, equipment capabilities, and the like. The Content Customizer 106 selects from the processed clips at the time of network transport for most efficient delivery, given current network conditions. In this way, the system 100 can scale to different sized installations with a variety of equipment and can maximize efficiency of network resources and quality of service.

System Construction and Operation

Figure 2:
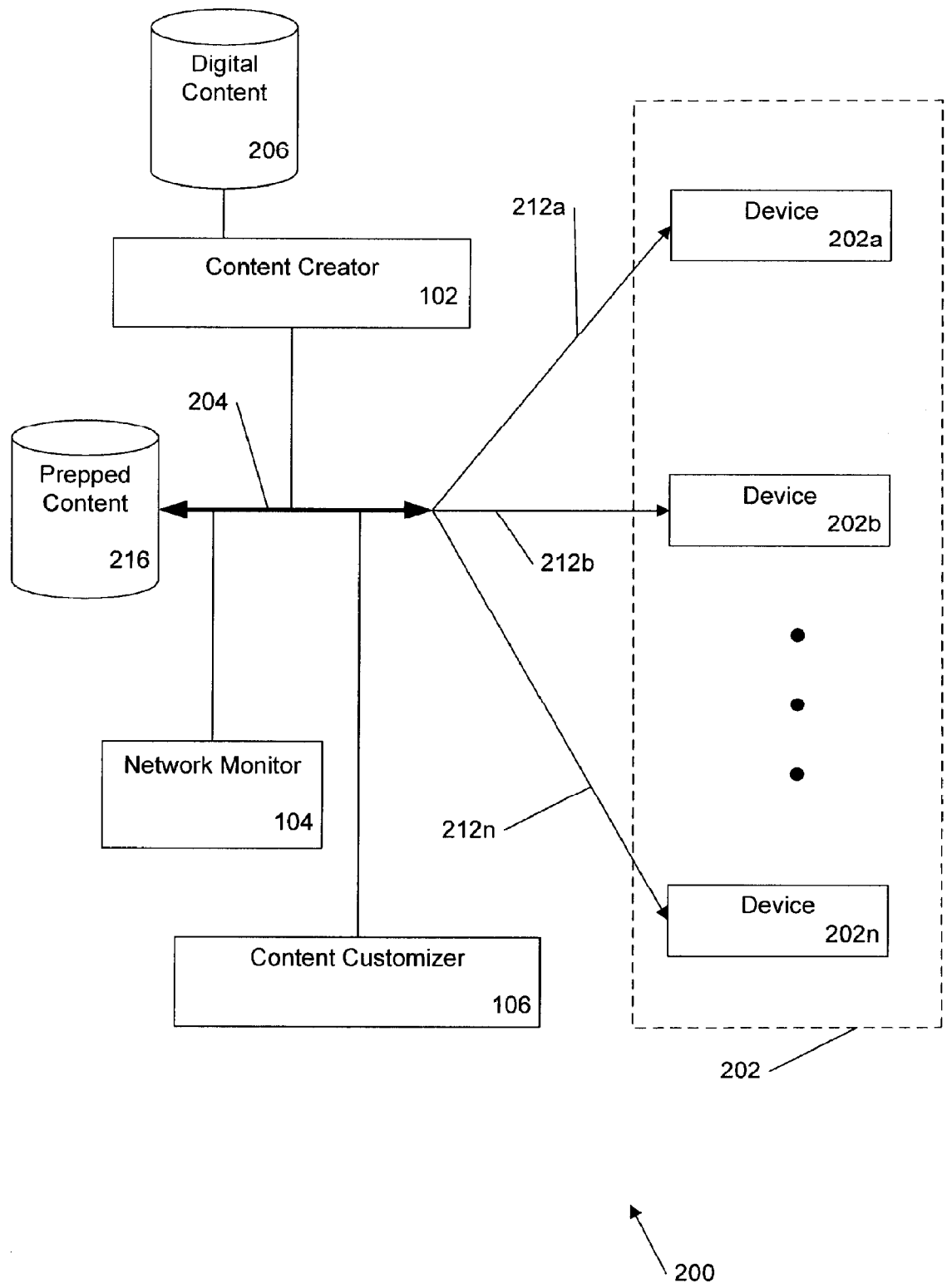
FIG. 2 is a block diagram of a processing system that performs operations in accordance with the present invention.

FIG. 2 is a block diagram of a processing system 200 constructed in accordance with the present invention to carry out the operations illustrated in FIG. 1. The block diagram of FIG. 2 shows that receiving devices 202 receive digital content including video content over a network connection 204. The digital content originates from a digital content source 206 and is processed by the Content Creator 102 in accordance with selected compression parameters and adapted for target network resources/device capability information. The adapted and processed content comprises prepped content, which can be maintained at a Prepped Content store 216 that is separate from the source files 206, or can be at the same network location with the source content files. The propped content 216 is selectively retrieved and combined in response to current network conditions and in accordance with customizing operations (i.e., customized) by the Content Customizer 106. The receiving devices include a plurality of devices 202a, 202b, . . . , 202n, which will be referred to collectively as the receiving devices 202.

For each one of the receiving devices 202a, 202b, . . . 202n, the Content Customizer determines a set of customizing operations that specify multiple streams, or paths, of customized digital content data in accordance with available network resources, and selects one of the customized data streams in accordance with network conditions as a function of estimated received quality. The current network conditions for each corresponding device 202a, 202b, . . . , 202n are determined by a Network Monitor 104 that is located between the prepped content 216 (i.e., the source of the customized clips) and the respective receiving device. The Content Customizer 106 can apply the selected customizing operations to the available digital content from the content source 206 and can provide the customized video stream to the respective devices 202, or the Content Customizer can communicate the selected customizing operations to the Content Creator or to a processor at the Prepped Content 216, which can then apply the selected customizing operations and provide the customized data stream to the respective devices. In either case, the Network Monitor 104 can be located anywhere in the network between the prepped content 216 and the devices 202, and can be integrated with the Content Customizer 106 or can be independent of the Content Customizer.

The network devices 202a, 202b, . . . , 202n can comprise devices of different constructions and capabilities, communicating over different channels and communication protocols. For example, the devices 202 can comprise telephones, personal digital assistants (PDAs), computers, or any other device capable of displaying a digital video stream comprising multiple frames of video. Examples of the communication channels can include Ethernet, wireless channels such as CDMA, GSM, and WiFi, or any other channel over which video content can be streamed to individual devices. Thus, each one of the respective receiving devices 202a, 202b, . . . , 202n can receive a corresponding different customized video content sequence of frames 212a, 212b, . . . , 212n. The frame sequence can be streamed to a receiving device for real-time immediate viewing, or the frame sequence can be transported to a receiving device for file download and later viewing.

Figure 3:
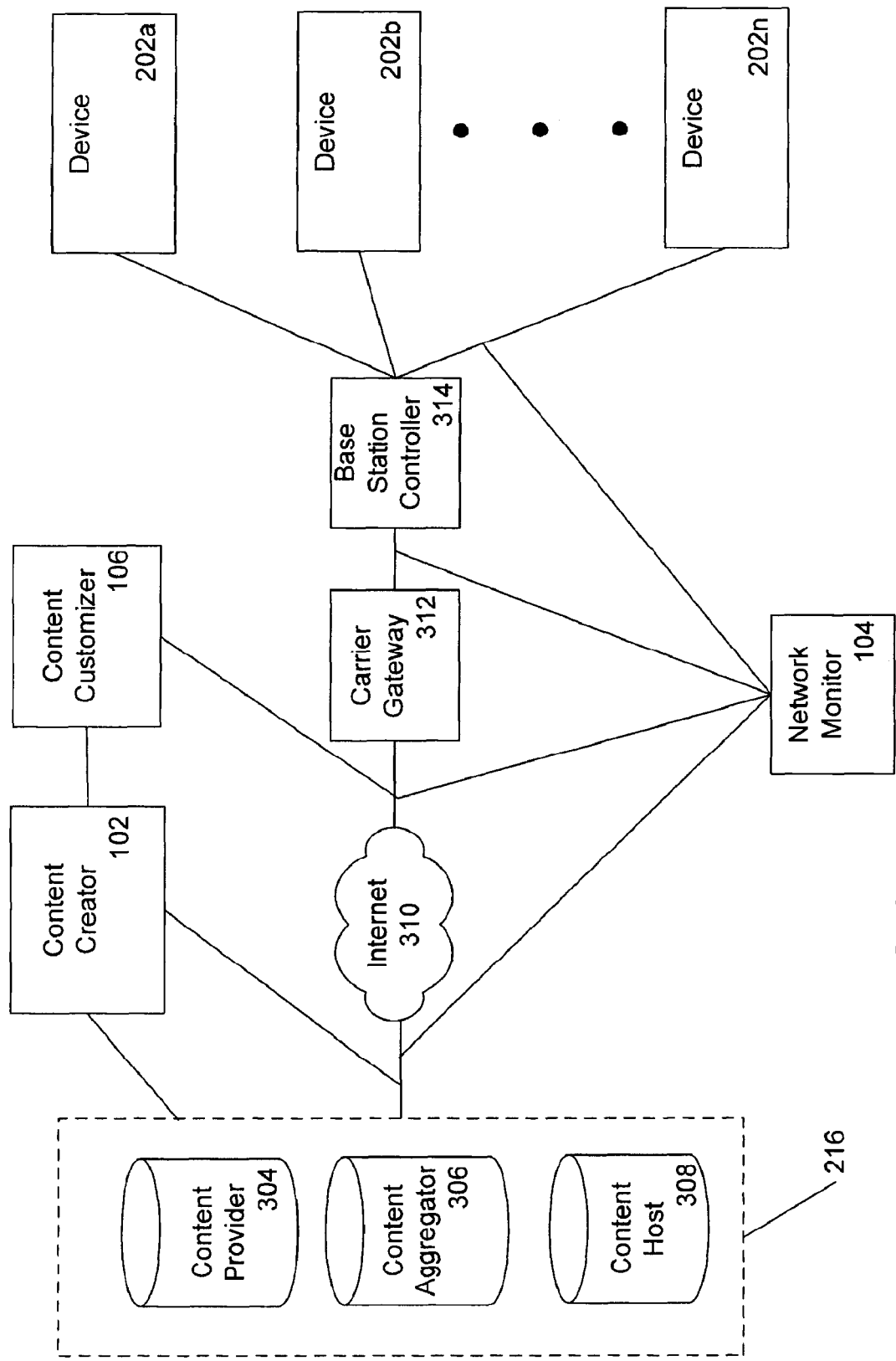
FIG. 3 is a block diagram of a network configuration in which the FIG. 2 system operates.

FIG. 3 is a block diagram of a network configuration 300 in which the FIG. 1 system operates. In FIG. 3, the receiving devices 202a, 202b, . . . , 202n receive digital content that originates from the Prepped Content 216, which is indicated as including digital content source files from a content provider 304, content aggregator 306, and content host 308, from which the prepped content is produced. As noted above, the original digital content 206 can be located with the prepped content 216 as illustrated in FIG. 3, or can be located at a different network location (such as illustrated in FIG. 2). The prepped content to be processed according to the Content Customizer is retrieved from the Prepped Content 216, and can originate from any of these sources 304, 306, 308 for preparation by the Content Creator. Thus, FIG. 3 shows the Content Creator 102 in communication with the Prepped Content 216, and shows the Content Customizer 106 in communication with the Content Creator 102. The sources 304, 306, 308 can provide content that includes video content, audio content, multimedia files (such as MPEG-4, AVI, WMV, RM, and the like), Web content (including HTML, XHTML, WAP, and the like), and live streaming data (such as multimedia streaming files, MPEG-4, MP3, HDTV, live NTSC, PAL, and SECAM content), and the like. Communications between the Content Creator and Content Customizer can occur directly by physical connection or by installation on the same computer, or can occur between two computers that communicate over a network such as a LAN or the Internet. In the FIG. 3 illustration, the receiving devices 202 comprise wireless communication devices. FIG. 3 shows that the typical path from the prepped content 216 to the receiving devices 202 extends from the prepped content, over the Internet 310, to a carrier gateway 312 and a base station controller 314, and then to the receiving devices. The communication path from prepped content 216 to devices 202, and any intervening connection or subpath, will be referred to generally as the "network" 204.

The Content Customizer can be located anywhere in the network so long as it can retrieve prepped content 216 and can communicate with a network connection from which the customized video content can be transported to one of the devices. That is, the carrier gateway 312 is the last network point at which the digital content can be modified prior to transport to the receiving devices, and therefore FIG. 3 shows the Content Customizer 106 communicating with the network (Internet 310) upstream or prior to the gateway 312.

A processing system constructed in accordance with the present invention obtains access to one or more multimedia digital content clips in a scheduled or ad-hoc manner, generates corresponding processed versions of the constituent tracks that make up the clip, with optimum combinations of processing parameters, and makes these tracks available at transport time for dynamic customization and composition back into a completed, processed digital content clip. The tracks of a clip are typically of different formats from each other. For example, the tracks of a multimedia clip may include a video track, an audio track, and a closed caption track. A complete multimedia presentation or file to be viewed may comprise several clips that are concatenated, or composited, into a single file at the time of network transport so the customized composited file can be efficiently streamed or downloaded to a receiving device.

Given an input digital content clip, the content clip is processed by the Content Creator 102 to generate several ingredients, or streams, of processed tracks for various combinations of parameters. An appropriate selection of the possible combinations of processed tracks, as described further below, will enable the selection of the optimal frames by the Content Customizer 106 for any given network condition. For a content clip that includes video data, the processing will include selection of processed data on a frame-by-frame basis. There are several processing parameters that affect the quality, error resiliency, and effective bitrate of an audio/video stream, e.g. frame rate, frame resolution, pixel format, pixel depth, compression parameters such as quantization scheme and level, frame type such as I, P, and B frames, intra-coded slices in a frame, and the like.

By encoding an input track, called herein an "I" track, for various values of these compression parameters, a "pool" of frames is generated, the pool having varying quality, error resiliency, and bit requirements. The selection of which video parameters to change, referred to herein as "C", to obtain this pool of frames, is important to the optimal selection of a frame matching a certain desired quality, bit-rate, and error resiliency at the time of network transport.

Thus, the various intermediate (i.e., constituent) tracks (to be identified herein by "S") can be regarded as functions of these encoding parameters (all other parameters remaining constant) C1, C2, C3, and so forth, and can be represented as $$S1=f(I,C1)$$

$$S2=f(I,C2)$$

$$S3=f(I,C3)$$

where C1 could be frame rate and quantization scale, C2 could be quantization scale and frame type, and so forth. These concepts will be illustrated through a few example scenarios.

In addition to providing all options necessary for addressing network variation, the above optimized choice of compression parameters would also save processing time at the time of generation of these options. For a particular frame, there are several options available, which are encoded at various parameter values. These options enable the selection of the optimal frame at the time of network transport. Thus, an output stream 'O' can consist of frames encoded using different parameters. Thus, the output stream can be represented as: O=f(S1, S2, S3, . . . ).

Figure 4:
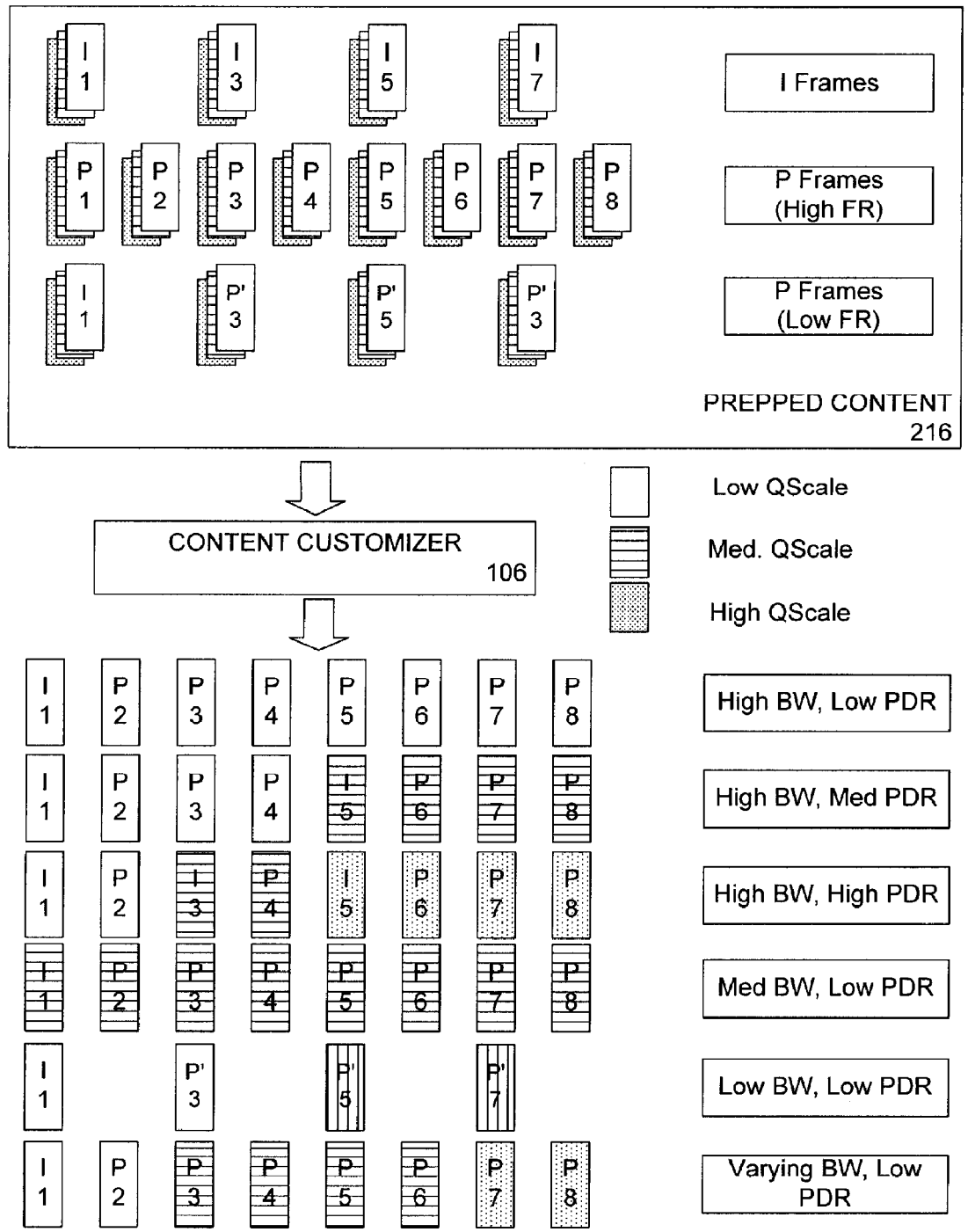
FIG. 4 is a depiction of data flow in the system illustrated in FIGS. 1-3.

FIG. 4 demonstrates one example methodology implemented by the illustrated system of FIGS. 1-3 wherein a set of ingredients (processed tracks) are created by the Content Creator 102 to produce prepped content 216 and are then used by the Content Customizer 106 to generate different data streams for different combinations of network conditions at transport time. The clips prepared by the illustrated embodiment incorporate video data, and therefore will be described in terms of frames, but it should be understood that the system configuration applies equally to clips with other types of data content, including clips with no video data.

To better understand the depiction of FIG. 4, certain properties of video compression should be noted. One of the compression parameters is the video frame type. Those skilled in the art will understand that a video frame can be encoded independently of any other frames to produce an Intra-frame, otherwise called an I-frame. An I-frame does not depend on previous frames but is self-contained, and therefore it provides good error resiliency. The I-frame, however, needs more bytes for digital representation. Another type of frame is encoded based on the difference between the current frame and previous encoded frames. This is a frame type called an Inter-frame or P-frame. Unlike the I-frame, the P-frame cannot be generated independently of information from a preceding frame. A P-frame is smaller in size relative to a corresponding I-frame, however, the P-frame does not provide an error resiliency like that of the corresponding I-frame. One parameter that can be used to change the data size of each of the frame types is quantization scale. As quantization scale increases, the data size of the frame decreases, with a reduction in quality of the viewed image.

As illustrated in the upper portion of FIG. 4, for every frame, the Content Creator 102 creates a few processed ingredients (data for each of the constituent tracks), specifically, it creates: I-frames at different quantization levels (indicated herein as "QScale"), P-frames at different quantization levels, and P-frames at different quantization levels at different frame rates (indicated as high frame rate and low frame rate). In FIG. 4, two different frame rates (FR) for the P-frame streams are illustrated, a high FR and a low FR, but additional rates my be provided in accordance with the system resources. The I-frames at different QSeales are represented as the collection of I-frames I-1, I-3, I-5, and I-7 where 1, 3, 5, and 7 are an index of frames. Because frames are referred to sequentially, the index of I-frames indicates that intervening video source frames (i.e., I-2, I-4, I-6) are not included in the I-frames index at the top of FIG. 4. That is, the Content Creator has decided that only alternating I-frames are needed for the stream. The P-frames at different Q-levels and at high FR are represented in FIG. 4 as the collection of P-frames at High FR P-2, P-3, . . . , P-8 after the initial I-frame at I-1. The P-frames at different Q-levels and at low FR are represented as the collection of P'-frames at Low FR P'-3, P'-5, and P'-7 after the initial I-frame at I-1. The P-frames at the low FR are indicated as P'" to distinguish them from the high FR P-frames. That is, the frame P-3 is a different frame from the frame P'-3, because P-3 represents differences from frame P-2, whereas frame P'-3 represents differences from frame I-1. The processed frames at different QScales are shown in FIG. 4 with different fill shadings. That is, for frames at low, medium, and high quantization scales, the exemplary frames shown in FIG. 4 use a fill color of white, horizontal lines, and dotted fill, respectively. These collections of frames illustrated in FIG. 4 comprise prepped content 216, which the Content Creator 102 makes available to the Content Customizer 106. Using these ingredients, the Content Customizer 106 can potentially generate multiple customized versions of the streams, wherein each customized stream is based on the current network conditions in terms of bandwidth availability and packet drop conditions. These generated streams are then sent out over the network to the particular receiving devices according to their respective network conditions at the time of network transport.

The lower portion of FIG. 4 shows six exemplary data streams produced by the Content Customizer 106 using the prepped content 216, selected for network conditions to the different receiving devices at the time of transport. For example, from the collection of processed frames 216 illustrated at the top of FIG. 4, the Content Customizer 106 can produce a processed clip for a high bandwidth, low PDR (packet drop rate) network condition, or the Content Creator can produce a high bandwidth, medium level PDR processed clip using two sequences of an I-frame followed by a string of P-frames (I-1 followed by P-2, 3, 4 and I-5 followed by P'-6, P-7, P-8). It should be noted, in comparing the High BW, Low PDR stream to the High BW, Medium PDR stream, that the addition of an I-frame at I-5 results in the Content Customizer selecting a higher compression (QScale) for the second stream, because the additional information of the extra I-frame must fit into the same bandwidth as the previous stream having only one I-frame. Another possibility for the customized stream is for the Content Creator to produce a stream for a low bandwidth, low PDR network condition. In the fifth exemplary processed clip, the Content Customizer selects an initial I-frame, followed by three subsequent P-frames at different levels of compression. In this example, the Content Customizer has selected an initial I-frame and the first P-frame P'-3 at the lowest compression, followed by two P-frames at higher levels of compression, so as to fit all four frames within the allotted bandwidth for the network conditions at the time of transport.

Content Creator Construction and Operation

Figure 5:
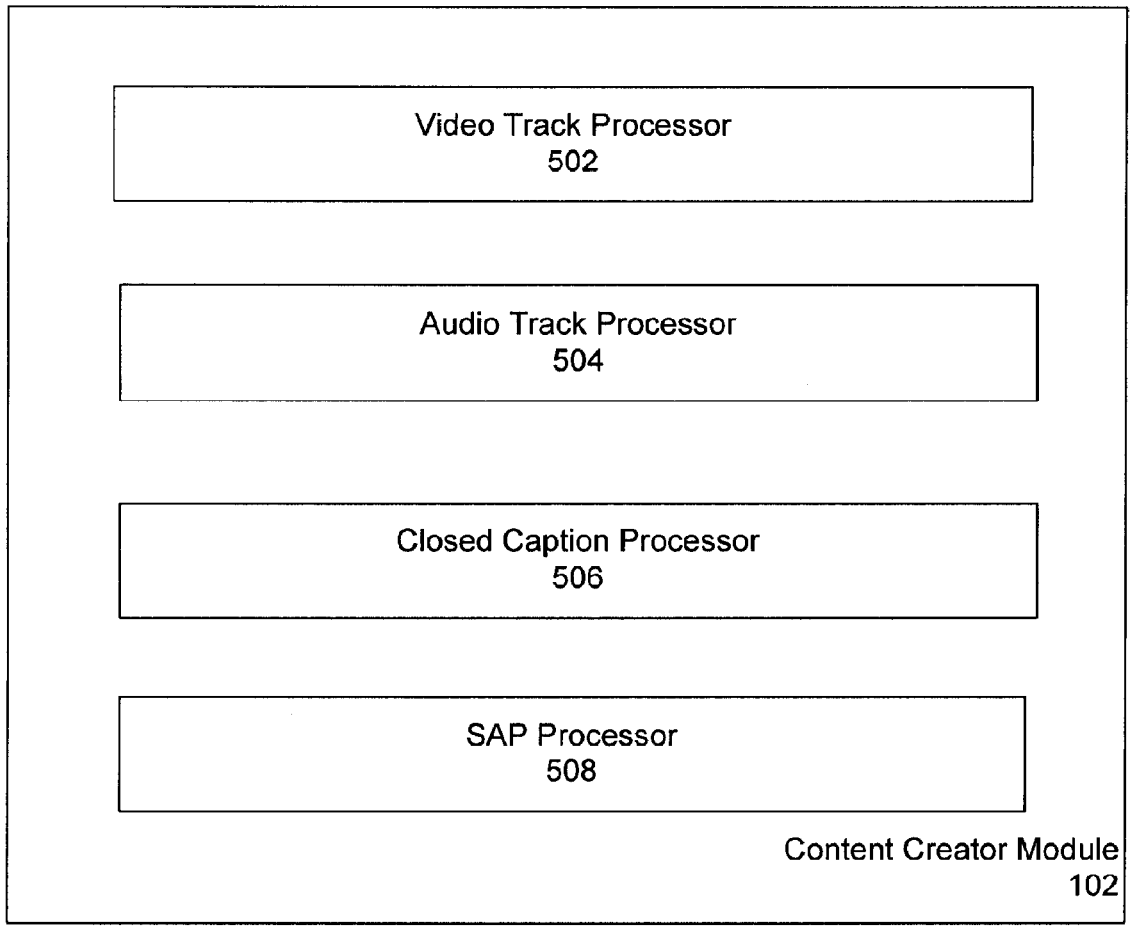
FIG. 5 is a block diagram of the Content Creator module illustrated in FIG. 2 and FIG. 3.

FIG. 5 is a block diagram of the Content Creator module 102 illustrated in FIGS. 1-3. The Content Creator module will have a processor for each type of track to be processed. For example, in the illustrated system, digital content including tracks of video data, audio data, closed caption data, and second audio program data will be handled. Therefore, the Content Creator 102 includes corresponding processors indicated as a Video Track Processor 502, an Audio Track Processor 504, a Closed Caption Processor 506, and an SAP Processor 508. Other processors can be included, or deleted, depending on the system requirements. The respective processors can be embodied as independent hardware/software combinations, such as circuit boards or integrated circuit chips that operate under control of a central processor, or the respective processors can be embodied as operational modules of an integrated Content Creator module of the system that is installed on a computing device or in an embedded device and that operates under control of an operating system.

Figure 6:
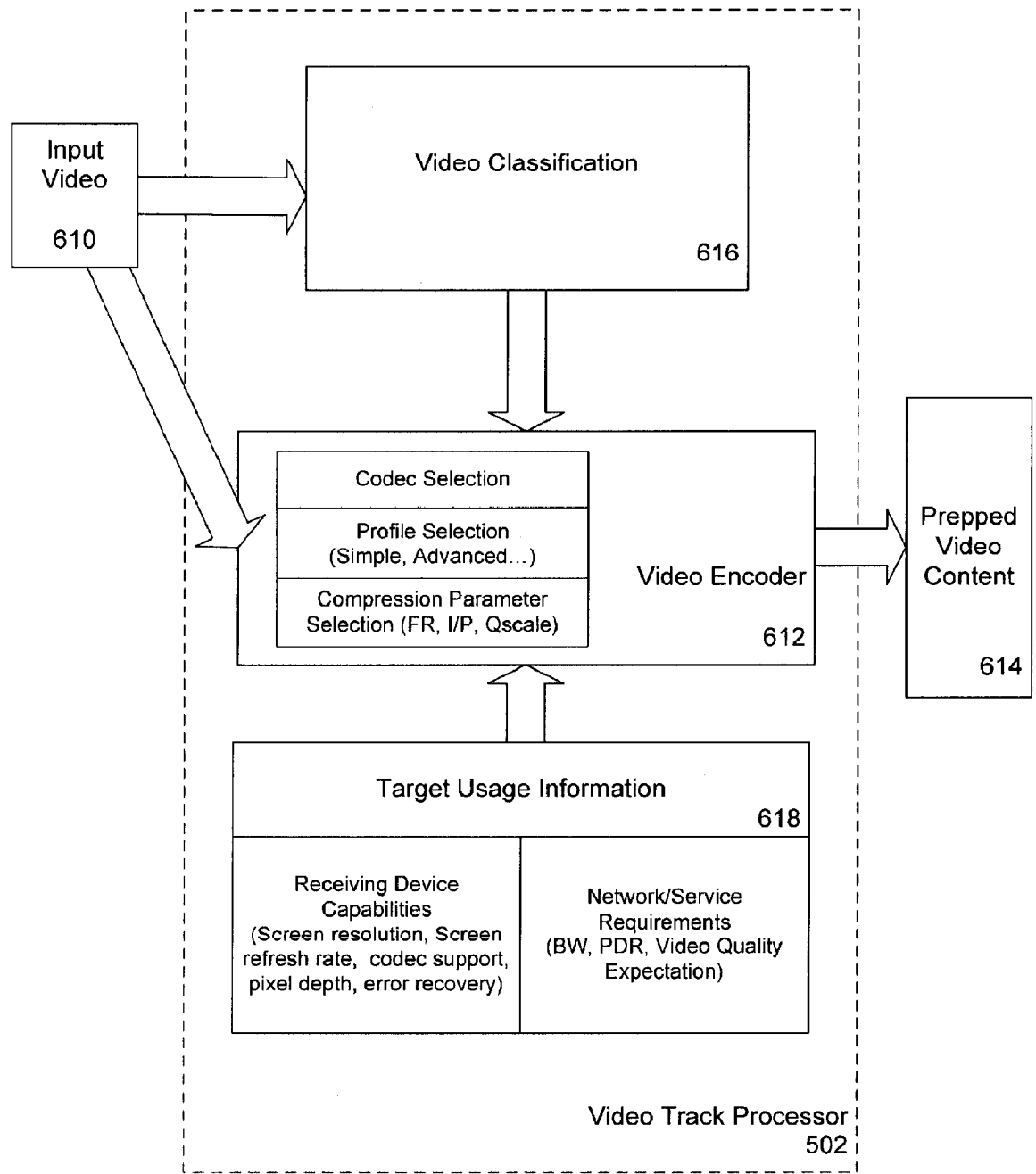
FIG. 6 is a diagrammatic representation of video processing operations performed by the Video Track Processor illustrated in FIG. 5.

FIG. 6 is a diagrammatic representation of video processing operations performed by the Video Track Processor 502 illustrated in FIG. 5. The basic sequence of operations for the video track processing module is to generate video ingredients from the input video track. Rather than preparing video content for one user at a time, the video track processor 502 encodes video content based on a profile that is customized for a plurality of users, collection of target devices, and different network conditions to make available multiple processed clips, or ingredients, for use by the Content Customizer. The input video track 610 of a clip is received by the Video Encoder block 612 to produce the Prepped Video Content 614. The Video Encoder can determine parameters such as compression, frame rate, and QScale from the content clip or from metadata supplied with the content clip. An optional Video Classification block can be provided to analyze the content clip and classify the content type and determine other input video characteristics. For example, the input video content type might be classified as high motion or low motion, news, sports, music performance, wildlife, cartoons or animation, theatrical movies, and so forth. The video content type can be determined by the Video Analyzer by the digital data itself or from metadata received for the clip, or some combination of such data. The video content type is used in selecting some of the compression parameters. An optional Target Usage block 618 receives information about target receiving device capabilities, such as display screen resolution, screen refresh rate, codec support, pixel depth, error recovery, and the like. The Target Usage block also receives information about requirements for the network and for desired service, such as available bandwidth, PDR, and video quality expectation. Such information can be retrieved from stored data about particular networks or accounts or system devices, or from metadata with the content clip, or other sources and interfaces. The target usage information is used in selecting some of the compression parameters.

Based on the input video characteristics and content classification and target usage information, the Video Encoder 612 of the Content Creator 102 performs video compression by selecting the appropriate values for codec type, profile type and compression parameters. In selecting the optimized combination of compression parameters, the additional information about content classification and target usage characteristics is helpful. In absence of this information, a default combination of content and target usage characteristics is used, or potential modifications according to such parameters are ignored. For example, if no target device has a refresh rate higher than 15 fps, the Content Creator video encoder should not generate any combination that has a higher frame rate than 15 frames per second. If that information is not available, then the Content Creator would use a default value or procedure for selecting from among the frame rates to make available to the Content Customizer. Similarly, even if the network condition allows a video clip of higher bandwidth to be streamed, a device might limit the maximum bandwidth of the content that can be received/decoded in real-time.

Figure 7:
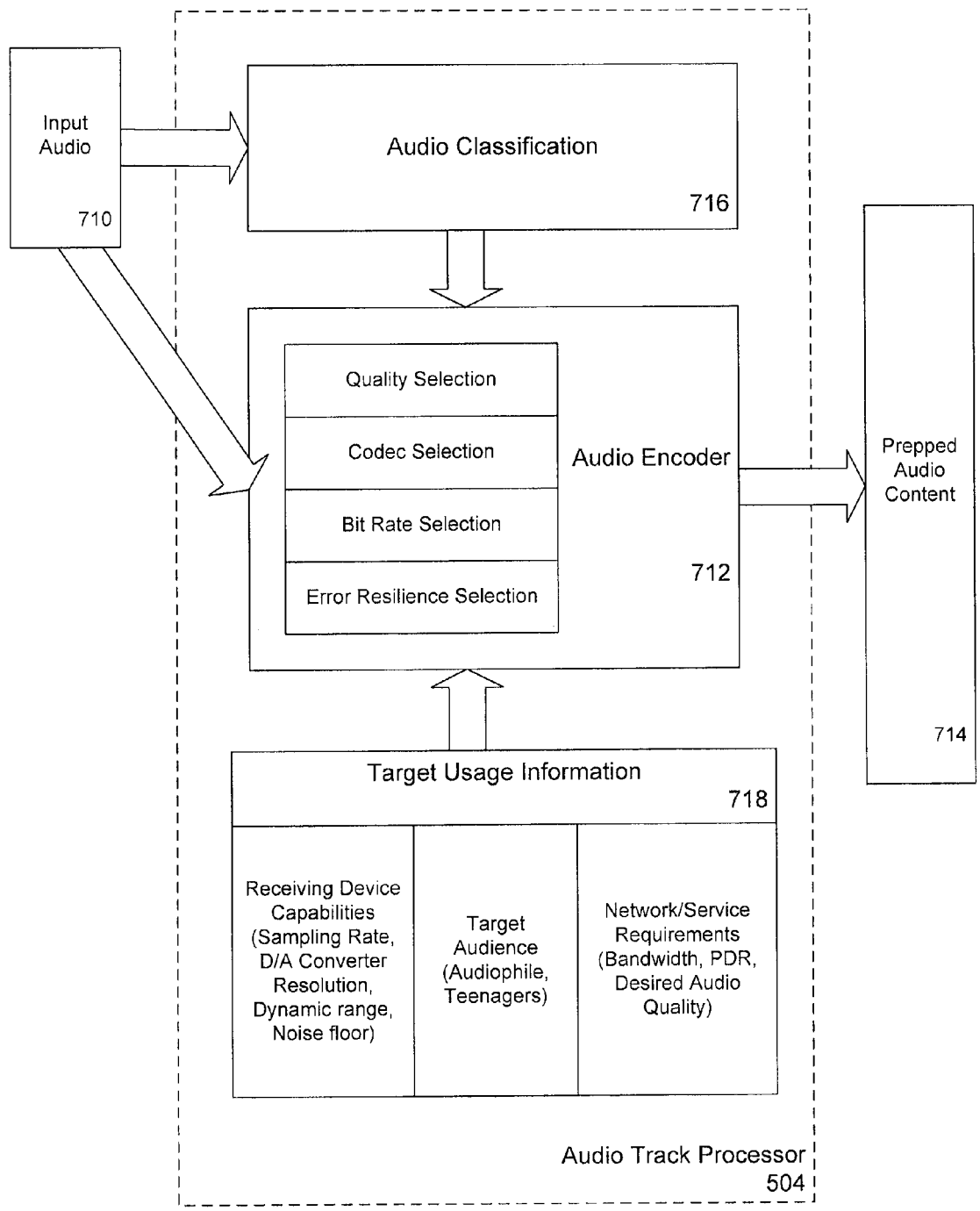
FIG. 7 is a diagrammatic representation of audio processing operations performed by the Audio Track Processor illustrated in FIG. 5.

FIG. 7 is a diagrammatic representation of audio processing performed by the Audio Track Processor 504 illustrated in FIG. 5. Rather than preparing audio content for one user at a time, the audio track processor 504 encodes audio content based on a profile that is customized for a plurality of users, collection of target devices and different network conditions. In addition, the profile automatically selects certain encoding parameters based on the operating environment. For example, if the prepped audio content is to be served to users who are in both error-prone channels and in QoS-controlled channels, the audio encoder will generate a plurality of prepped audio content that is suitable for use under both scenarios.

The Audio Processor 504 receives the input audio track 710 at an audio encoder block 712 that determines parameters such as sampling rate of the track, dynamic range, and number of audio channels. Such information can be determined by the encoder through examination of the audio file itself, or from metadata associated with the clip, or other determination means. The Audio Track Processor 504 can include an optional Audio Classification block 716 that classifies the type of audio being processed. For example, the block might classify audio types to include music or speech or silence, tone or noise information, and perceptual entropy that captures the amount of audio information present in the input data. In addition, an optional Target Usage block 718 may be provided to provide information about target receiving device capabilities, such as acceptable sampling rates, resolution of D/A converters, dynamic range, noise floor, and the like. Information about the target audience can be received, to indicate an "audiophile" audience or indicate a teenage audience, and so forth, that might influence audio processing. The Target Usage block also receives information about requirements for the network and for desired service, such as available bandwidth, PDR, and audio quality expectation. Such information can be retrieved from stored data about particular networks or accounts or system devices, or from metadata with the content clip, or other sources and interfaces. The target usage information is used in selecting some of the compression parameters and other audio processing details. For example, the codecs used might include aacPlus for wideband audio, AMR-NB for speech, and no encoding for silence.

The audio data is provided to the audio encoder 712 and is processed according to the audio classification in accordance with the specified target device characteristics, target audience and network/service requirements. That is, based on the input audio characteristics and content classification and target usage information, the Audio Encoder 712 of the Content Creator 102 performs audio compression by selecting the appropriate values for quality selection, codec type, bit rate selection, profile type, error resilience, and compression parameters. In selecting the optimized combination of compression parameters, the additional information about content classification and target usage characteristics is helpful. In the absence of this information, a default combination of content and target usage characteristics is used, or potential modifications according to such parameters are otherwise ignored. For example, if no target device has a dynamic range greater than 10 kHz, the Content Creator audio encoder 712 should not generate any combination that has a higher reproduced frequency than 10 kHz. If that information is not available, then the Content Creator would use a default value or procedure for selecting from among the dynamic frequency limits to make available to the Content Customizer. Similarly, even if the network condition allows an audio clip of higher bandwidth to be streamed, a device might limit the maximum bandwidth of the content that can be received in real-time.

Next, we present a few examples illustrating the above concept where the audio generation process is optimized for different input/target device/network combinations. The bit-depth and dynamic range are selected according to audio data type. For example, if the audio is 8-bit uLaw encoded, then the lowest target bit rate available could be used, because the noise floor of the source audio is high. A high bit-rate compression can be used when the input audio has high fidelity representation. The available range of band influences the audio processor operation. If the audio is band-limited to 4 kHz, the audio encoder should use AMR-NB, and a suitable codec would be selected. If the audio is bandwidth limited to 8 kHz, then AMR-WB could be used. For wide-band audio, aacPlus should be used. Another input parameter that affects the audio processing is the number of channels. It is much more efficient to use multi-channel aware compression like AC-3 for an audio source with two or more channels. Similarly, based on the target audience and their susceptibility to different audio artifacts, different combination of audio processing can be selected. If the end users are audiophiles, audio encoder will have to use a high bit rate in combination with a wide-band compressor.

As an example of target usage information that affects processing, if the target devices are low end cellphones, there is no need to generate audio compressed with a wide-band compressor like aacPlus, because low-end cellphones generally do not support these high quality codecs. Alternatively, it might be advisable to use a codec with a relatively high error resiliency for wireless delivery if the target device has greater capabilities, such as greater sampling rates, better D/A converters, and greater dynamic range.

Some examples will help to illustrate the processing of the audio track processor 504.

Example 1

Assume that the audio input is bandwidth limited audio at 4 kHz. With this type of audio input, the audio encoder can detect that the source audio is of toll quality (i.e., telephone grade) and will only encode the audio input content using narrow-band speech compression.

Example 2

Assume that the same audio content is to be served to both audiophile and GPRS cellphones. With this type of audio input, the audio encoder will encode content using both narrow-band speech (AMR-NB) compression and wide-band audio waveform compression (e.g. AAC-HE)

Example 3

Assume a situation that combines the parameters of Example 1 and Example 2. Thus, the audio input is bandwidth limited and must be served to both audiophiles and GPRS cellphones. Then because the audio is already band limited, there is no need to compress it with wide-band audio waveform compression, so only narrow-band speech compression would be used.

Figure 8:
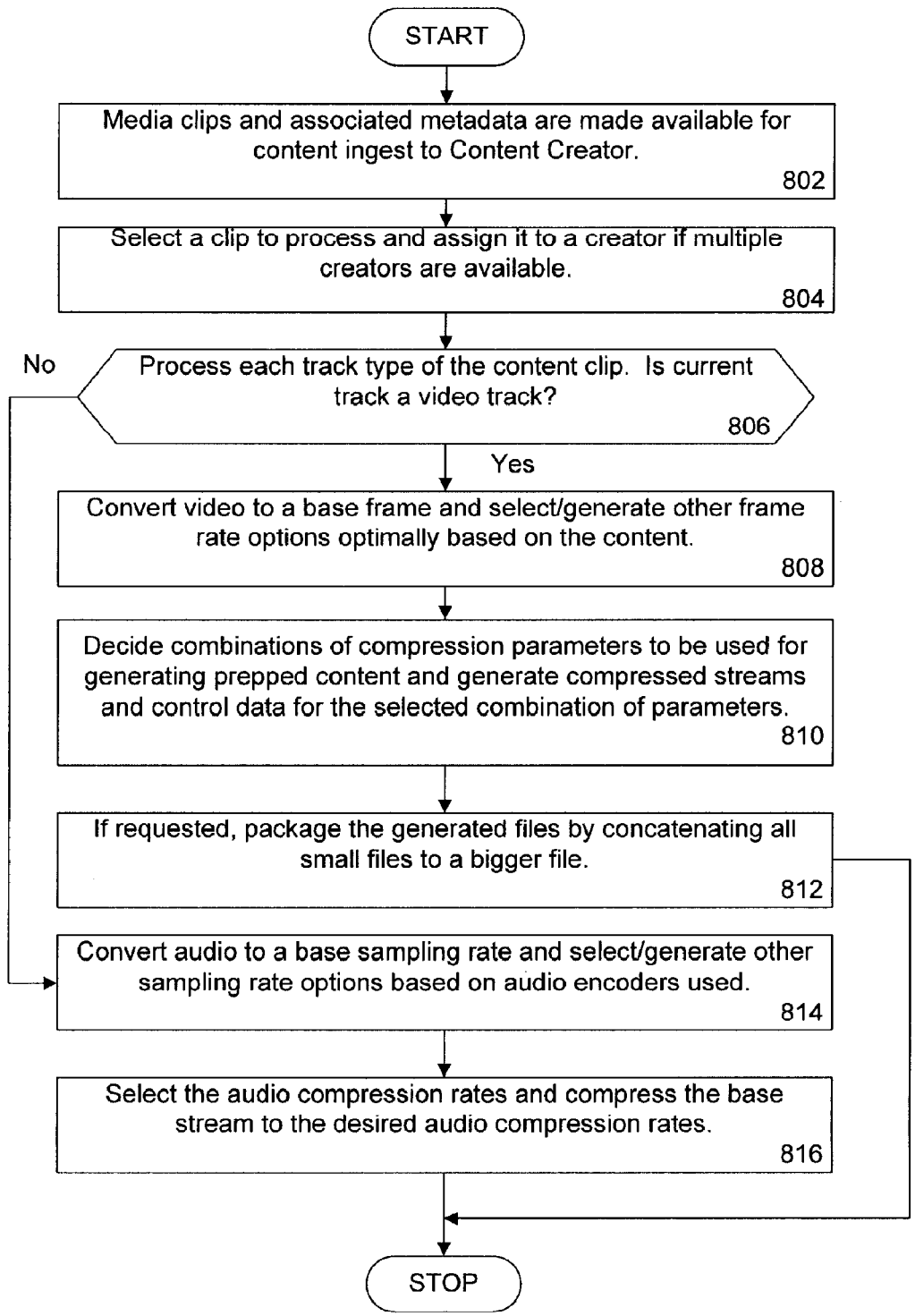
FIG. 8 is a flow diagram of the operations performed by the Content Creator module illustrated in FIG. 5.

FIG. 8 is a flow diagram of the operations performed by the Content Creator module 102 illustrated in FIG. 5. In the first processing operation, represented by block 802, the Content Creator receives content clips, such as multimedia clips, and associated metadata to be processed, i.e., ingested. Next, at block 804, the Content Creator selects a clip for processing. If the Content Creator includes multiple processors, then the clip is assigned to an appropriate one of the processors. At block 806, the Content Creator determines if the track of the content clip being processed is a video track. If it is a video track, an affirmative outcome at block 806, then at block 808 the video track is converted to a base frame rate and other frame rate options are selected and generated, based on the clip content. The content can be determined from the metadata, to indicate whether the clip is one for which a high frame rate is indicated (e.g. sports or entertainment) or if a lower frame rate will suffice (e.g. a slide show or lecture presentation). Next, at block 810, the Content Creator decides the combinations of compression parameters to be used for generating the prepped content and generates compressed streams and control data for the selected combinations of parameters. At block 812, the Content Creator responds to a requested concatenation operation by concatenating the generated files and producing a package of all smaller files into a single larger file. The processing of the Content Creator for the clip then terminates.

At block 806, if the track being processed is not a video track, then operation proceeds to block 814, where the Content Creator implements processing for the appropriate track data type. In the illustrated system, such processing involves audio data. Thus, at block 814, the audio data is converted to a base sampling rate and other sampling rate options are selected and generated, based on the audio encoders available to the Content Creator. The Content Creator then selects audio compression rates and compresses the base data stream to the desired audio compression rates, as indicated at block 816. The processing for the current clip then terminates.

The processing of the Content Creator will be better understood with reference to two example cases for accommodating a variety of frame rate selection.

Case 1: Frame Rate Generation

One example of compression parameter selection by the Content Creator 102 is to decide an appropriate frame rate based on content type. Consider a high-motion input video clip, such as a music video. This implies a higher amount of change between successive frames as compared to a talking-head documentary video clip. To provide a smooth, quality experience with fast-changing content, the frame rate used to encode this video should be as high as possible, because a low frame rate will typically result in a "jerky" video experience. The Content Creator considers processing parameters and network resource availability in the form of target values, and selects the best available set of parameters from which to produce the processed streams. For example, in this case for high-motion video, the Content Creator would likely encode the content at 15, 12, and 9 frames per second as alternatives for the Content Customizer, assuming such values would still meet the target bandwidth range. The Content Creator would not likely consider selecting 6 frames per second and 3 frames per second for the processed content, because the lower frame rates would potentially sacrifice the quality of each of the frames and produce an unacceptable quality video experience.

Figure 9:
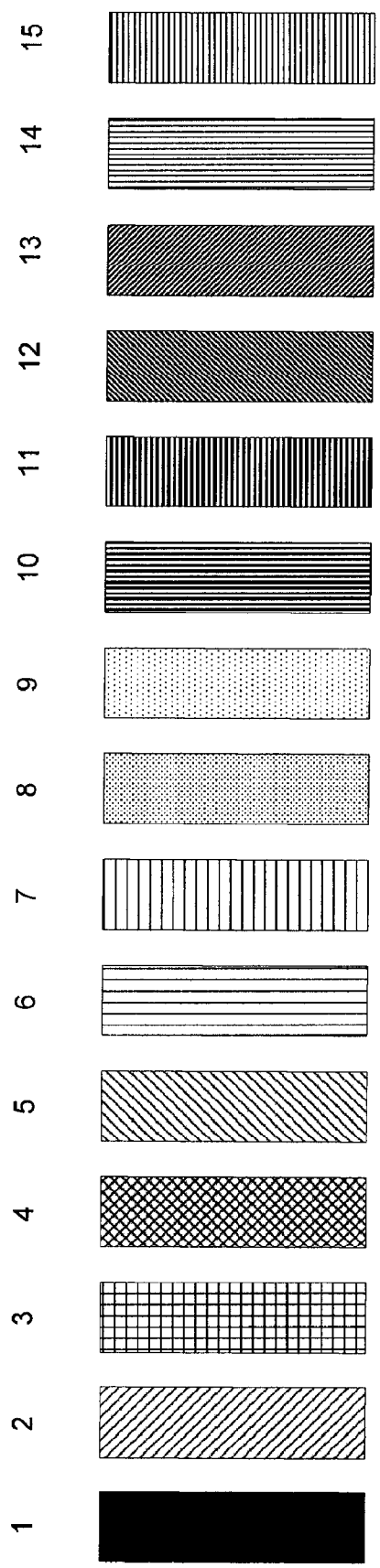
FIGS. 9-10 are diagrammatic representations of video processing operations for video track compression.

In addition to selecting the frame rates to be generated, it is also important to determine how the lower frame rate content will be generated from the base frame rate video. The following example will help illustrate how different frame rates are optimally generated. Assume that the input clip is provided at a base frame rate of 15 fps (frames per second). Then a one-second sequence of fifteen frames can be represented as illustrated in FIG. 9, with each frame represented in a different box. The boxes are show with different fill shadings to help distinguish them from each other.

Figure 10:
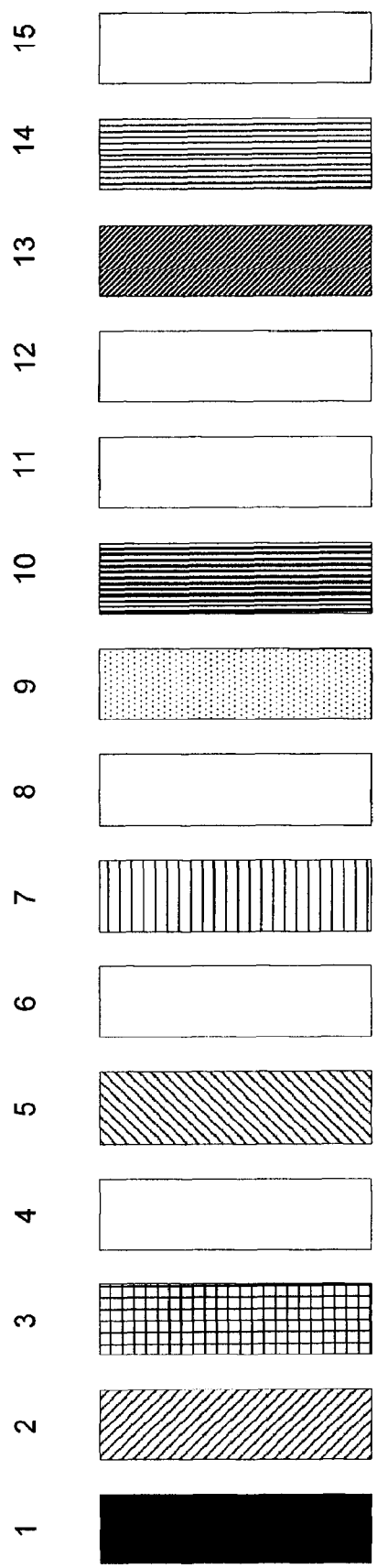

As noted above, it might be beneficial to determine frame rate by selecting frames guided by the content of the frames, for example, being mindful of scene-change frames and high-entropy frames. For example, if it is desired to generate a clip with a frame rate of 9 fps, as shown in FIG. 10, then it might be preferred to select the frames 1, 2, 3, 5, 7, 9, 10, 13, 14. That is, frames 4, 6, 8, 11, 12, and 15 have been excluded from the processed clip by the Content Creator and, for this stream, will not be available to the Content Customizer. To arrive at this conclusion, the Content Creator ranks the frames based on their content (entropy value). Then, the Content Creator selects the first "n" number of frames to determine which to select for a particular frame rate. Thus, we are assured that we have selected the most relevant frames. FIG. 10 indicates that entropy values for frames 4, 6, 8, 11, 12, and 15 were ranked lower than the entropy values for the other frames and therefore these frames were excluded. An entropy value may be calculated by pixel change count from frame to frame, from metadata indicating content information, or other information that will be known to those skilled in the art as indicating frame entropy.

Figure 11:
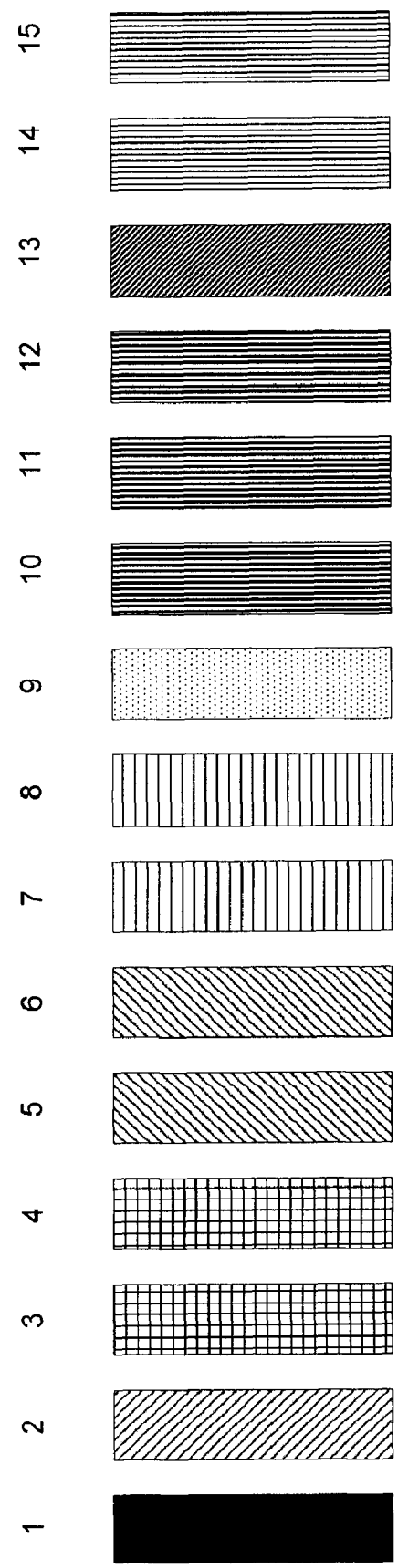
FIG. 11 is a diagrammatic representation of video processing operations for video track compression of the FIG. 9 frames for an MPEG-4 clip.

The generation of non-standard frame rates with unevenly spaced frames, and joining of disparate frame-rate sequences as part of a single video stream, poses some challenges for different codec implementations. For example, for an MPEG4-compliant stream, we keep the effective frame rate of all the individual frame rate sequences the same. One way to achieve this is as illustrated in FIG. 11.

As noted above in connection with FIG. 10, when the frames are ranked in the order of their entropy, for an effective frame rate of 9 fps, the frames selected are 1, 2, 3, 5, 7, 9, 10, 13, 14. For MPEG-4, the "excluded" frames (4, 6, 8, 11, 12, 15) cannot simply be deleted, rather, the MPEG-4 codec will expect to receive fifteen frames of data per second because the clip is associated with a 15 fps frame rate. In the uncompressed domain, the excluded frames are replaced with the previous relevant frame, to generate a "padded" 15 fps sequence. Thus, frame-3 will be duplicated so as to repeat at the frame-4 location, frame-5 will be duplicated to repeat at the frame-6 location, and so forth. After such a duplication operation, after compression, the padded frames have no new information with respect to the previous frame, so they can be removed without affecting the validity of the MPEG-4 content. Now, this sequence with effective frame rate of 9 fps can be streamed along with a 15 fps sequence, without violating MPEG-4 standards. In this way, the Content Creator can ensure that the Content Customizer can choose from among ingredients without fear of running afoul of the MPEG-4 standard.

Case 2: Selection of Quantization Level/Frame Resolution/Frame Rate

Next, we illustrate the concept of compression parameter selection using an example scenario. In video compression, compression parameters such as frame rate, frame resolution, and quantization scales, abbreviated as QScale in this discussion, affect the target bitrate of the stream. These parameters can be combined intelligently to achieve a wide spectrum of bandwidth variation while optimizing the options for each value of target bitrate.

Let us first explain the effect of each of the above parameters before illustrating how the parameters can be potentially combined to achieve different target bitrates or ranges of bitrates through examples. In a 15 fps sequence, we are sending fifteen video frames within one second of time. In a 7.5 fps sequence, we are sending half the number of frames in the same time period. This reduction will save almost 50% bandwidth, which can be utilized to send better quality frames at the same effective bitrate while reducing the smoothness of the video playback.

Similarly, if we were sending frames with size 176×144 pixels, we are sending 25344 pixels, each taking about 1.5 bytes in an uncompressed YUV420 stream, leading to a total of 38016 bytes per frame. If we were to send video with a resolution of 160×120 pixels, the number of bytes sent, by the same calculation, would be 28800. This is a saving of 9216 bytes, which is almost 25%, compared to the 176×144 frame.

Quantization scales can achieve a significant amount of change in the effective bitrate. A lower quantization scale translates to a better quality frame, but can also significantly increase the bits required for data representation. For example, a video sequence of 100 frames encoded at a QScale of 1, may take twice as many bytes as a sequence encoded at QScale 4, and may take ten times as many bytes as a sequence encoded at QScale 8.

An example to illustrate this fact: If the target bitrate range is between 50 and 100 kbps, we would generate a video sequence at 160×120 resolution, at lower frame rates such as 7.5 fps, 5 fps, and 3.75 fps. For a frame rate such as 7.5 fps, we would only encode QScale between the range of, for example, 8-18. For a frame rate such as 5 fps, we would encode at at QScale between 4-12, and for 3-75 fps, a QScale between 1-8. The QScale values are also selected such that video quality can be gracefully degraded or upgraded, based on instantaneous network bandwidth changes. That is, steps between implemented QScale values will not result in a harsh change from changing between consecutive QScale values.

If the target bitrate is beyond 400 kbps, the Content Creator generates a video sequence at 352×288 pixel resolution, and at higher frame rates such as 15 fps, 12 fps, and 10 fps. For a 15 fps frame rate, the Content Creator would only encode QScales between the range of, for example, 4-14. For 12 fps, the Content Creator would only encode QScales between 1-10, and for 10 fps, QScales between 1-8.

In the first step, the media clip is made available to the Content Creator module using any standard file access mechanism, such as NFS-mapped folder, FTP folder, local drive, access to a clip database, and the like. Along with the source media clip, a metadata file is provided that contains management input such as content category, relative prioritization of different streams available in the data, date/time to enable the clip for streaming, disable streaming, delete any associated data, author name, description, category, and so forth. If multiple clips are submitted for ingest, the Content Creator selects a media clip and corresponding data file to be processed. If multiple processors are available, the media clip and data file are submitted to appropriate Creator processes based on load-sharing considerations. There may be multiple Content Creator processes running on separate servers, and they may be geographically distributed with respect to the source media. Properties of the source media clip such as video/audio codecs, duration, and the like are written to an easily readable file and a central data repository, which may be a set of files or a database, and may be retrieved by known look-up techniques.

As a pre-processing step, Content Creator converts a video stream to an uncompressed YUV stream at the highest desired frame rate (base frame rate), and at the highest frame resolution. Other desired frame rates are derived from the base frame rate YUV. These frame rates are optimally selected to ensure smooth switching from one frame rate to the other. If the frame rates are not integral divisors of the base frame rate, some padding algorithm may be employed to pad these frame rate videos up to base frame rate video. Then, after compression, the padded frames can be dropped to achieve desired frame rate. Some quantitative measure, to gauge the change between successive frames, is required for optimal frame selection at time of streaming. This measure can be MSD values, calculated between two successive frames, once for every frame rate. Now the Content Creator will generate various streams, using different encoding options. These encoding options could be selected from among quantization scales, frame types (I, P or B), frame resolutions, and the like. Additional options will occur to those skilled in the art in view of this description. Apart from the video streams generated, other data is generated as well, such as the frame sizes for all streams, and some quantitative measure of compression loss, e.g. MSE.

Along with the actual video streams, data about the individual frame sizes and compression-related errors per frame is needed, to enable correct decision making by the Content Customizer at the time of network transport. Compression error is represented by Mean Standard Error (MSE), computed by comparing between the original input frame and the frame obtained after decompressing the compressed frame for all above-mentioned encoding parameters. To measure content change between successive frames, Mean Square Difference (MSD) is calculated. This should be generated once per frame rate stream. An example of prepped data generated with compression parameters for I-frame/P-frame and QScale only is shown in FIG. 12.

Figure 12:
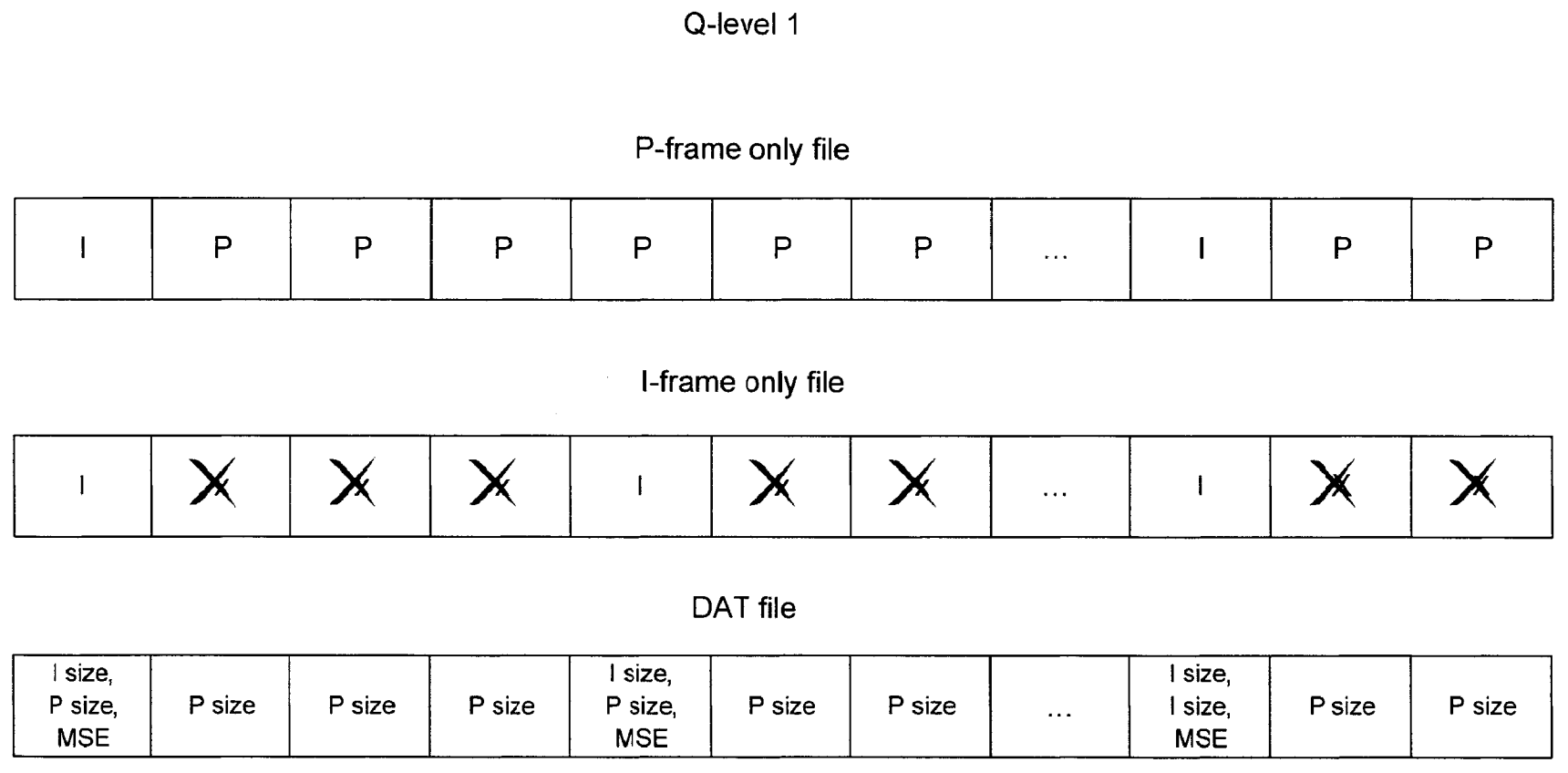

The first row of FIG. 12 shows a sequence of I-frames and P-frames. In the sequence, an I-frame is followed by a sequence of consecutive P-frames. Those skilled in the art will understand that, for an MPEG-4 stream, a maximum of 600 P-frames is allowed, whereupon a mandatory I-frame must be provided. The first row is identified as "P frame only" because only the minimal number of I-frames is inserted as determined by the previously mentioned implementation and/or standards. The second row of FIG. 12 is a corresponding sequence of I-frames spaced to achieve a desired target frame rate and bandwidth. FIG. 12 indicates that every fourth frame of the sequence is an I-frame. Other target frame rate and bandwidth values might involve providing every eighth frame as an I-frame, for example. The last row of FIG. 12 illustrates metadata that is generated by the Content Creator in performing compression on the I-frame data. That is, when the Content Creator compresses a frame of video data, it generates metadata that specifies the size of the I-frame, the size of the corresponding P-frame, and the MSE value for the I-frame. For each frame of P-frame data that is compressed, the metadata includes P-frame size data.

Content Customizer Construction and Operation

Figure 13:
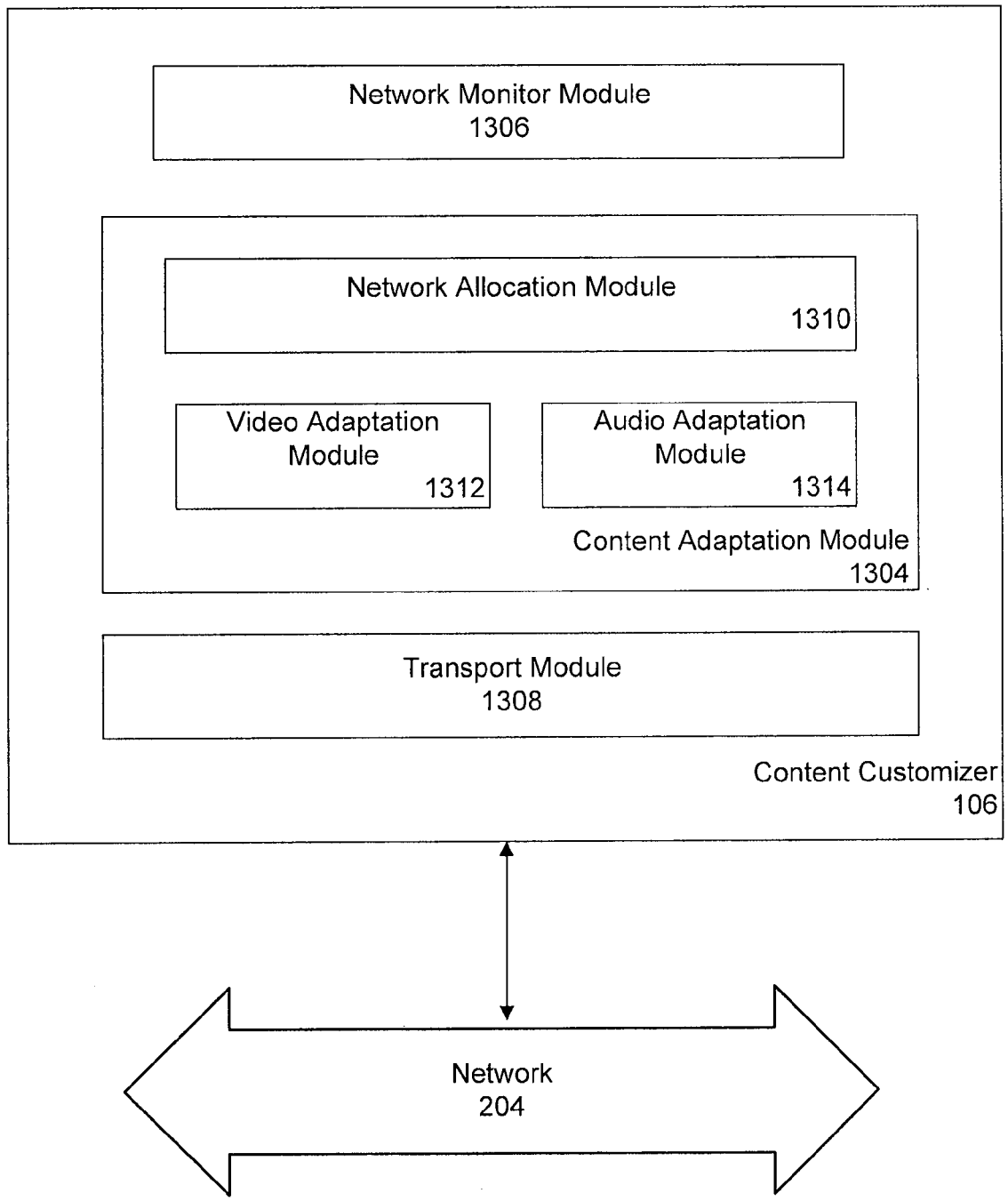
FIG. 13 is a block diagram of the components for the Content Customizer illustrated in FIG. 2 and FIG. 3.

FIG. 13 is a block diagram of the components for the Content Customizer 106 illustrated in FIG. 2 and FIG. 3. FIG. 13 shows that the Content Customizer includes a Content Adaptation Module 1304, an optional Network Monitor Module 1306, and a Transport Module 1308. The Network Monitor Module 1306 is optional in the sense that it can be located elsewhere in the network 204, as described above, and is not required to be within the Content Customizer 106. That is, the Network Monitor Module can be independent of the Content Customizer, or can be integrated into the Content Customizer as illustrated in FIG. 13. The Transport Module 1308 delivers the customized video content to the network for transport to the receiving devices. As noted above, the customized content can be transported for streaming or for download at each of the receiving devices.

The Content Adaptation Module 1304 customizes the stream (sequence of frames) for the receiving device based on the network information collected by the Network Monitor Module 1306. FIG. 13 shows that the Content Adaptation Module 1304 includes a Network Allocation Module 1310, a Video Adaptation Module 1312, and an Audio Adaptation Module 1314. The Content Adaptation Module 1304 includes adaptation modules for each track type of the digital content files to be handled. In the illustrated system, the digital content will include video tracks and audio tracks, and therefore FIG. 13 shows the Content Adaptation Module 1304 with a Video Adaptation Module 1312 and with an Audio Adaptation Module 1314. In general, the adaptation modules of the system will correspond to the processing modules of the Content Creator, as described below, in terms of types of tracks being processed. As noted above, at the time a content file is to be transported over the network 204, the Content Customizer 106 will dynamically select combinations of prepped content in accordance with current network conditions. Within the Content Customizer, the adaptation modules 1312, 1314 will perform the selection of combinations for their respective track types.

The Transport Module 1308 is responsible for assembling or stitching together a customized stream (sequence of frames) based on the decisions by the Content Adaptation Module and is responsible for transferring the assembled sequence of customized frames to the receiving device using the preferred mode of transport. Examples of transport modes include progressive downloads such as by using the HTTP protocol, RTP streaming, and the like.

Figure 14:
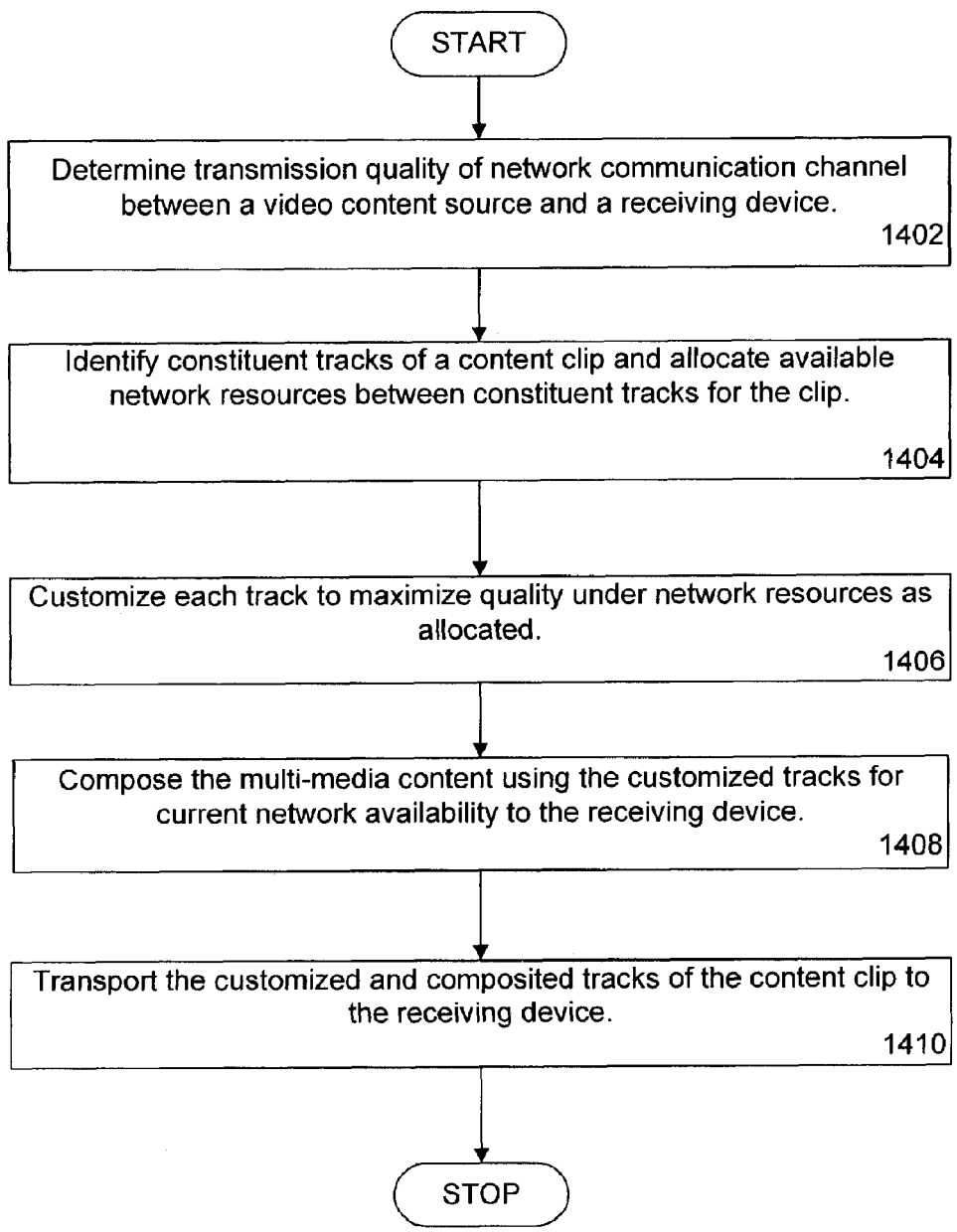
FIG. 14 is a flow diagram of operations performed by the system of FIG. 13.

FIG. 14 is a flow diagram of operations performed by a system constructed in accordance with the present invention. In the first operation, indicated by the flow diagram box numbered 1402, the quality of transmission is determined for the network communication channel between the source of digital video content and each of the receiving devices. The network condition can be specified, for example, in terms of available bandwidth and packet drop rate for a network path between the content server and a receiving device. One example of the network monitoring technique that can be used by the Network Monitor Module 1306 is for monitoring at the IP-layer by using packet-pair techniques. As known to those skilled in the art, in packet-pair techniques, two packets are sent very close to each other in time to the same destination, and the spread between the packets as they make the trip is observed to estimate the available bandwidth. That is, the time difference upon sending the two packets is compared to the time difference at receiving the packets, or comparing the round trip time from the sending network node to the destination node and back again. Similarly, the packet drop rate can be measured by counting the number of packets received in ratio to the number of packets sent. Either or both of these techniques can be used to provide a measure of the current network condition, and other condition monitoring techniques will be known to those skilled in the art.

Next, at box 1404, the system identifies constituent tracks of the content clip to be processed. This may involve a clip analysis process, by which the system determines the tracks comprising the clip. Such track data may be included in a clip header or metadata, or can be discovered using known data techniques. Those skilled in the art will understand how to determine track types in a content clip, in accordance with this description. The box 1404 operation also includes allocation of available network resources between the constituent tracks of the clip. This operation involves allocation of bandwidth as a function of total bandwidth available to the system. For example, a content clip may be prepared for network transport over an analog data line with a severe bandwidth limitation (e.g. 56 Kbps), or another version of the clip may be prepared for a high-speed connection for a variety of resources (e.g. 10 Mb or 100 Mb bandwidth). As described further below, the available bandwidth will be allocated among the constituent tracks, so that a video track will be allocated a portion of the available bandwidth, an audio track will be allocated another portion of the available bandwidth, and so forth, up to the bandwidth capacity of the network resources.

The box 1404 processing includes allocation of available resources between constituent tracks. This is achieved with the Network Allocation Module 1310 of the Content Adaptation Module 1304 (see FIG. 13). The goal of the Network Allocation Module is to split the total available bandwidth to different processors (shapers) based on priority and other additional information provided for each stream of the content, to thereby optimize bandwidth usage by audio and video shapers and improve quality level. For example, if the available network bandwidth is 100 Mbps, the Network Allocation Module may determine that the video track should receive 80% of that available bandwidth. The remaining 20% of bandwidth would then be allocated to the remaining track types in the content file. The processing of the Network Allocation Module is described further in conjunction with the description of FIG. 15.

Figure 15:
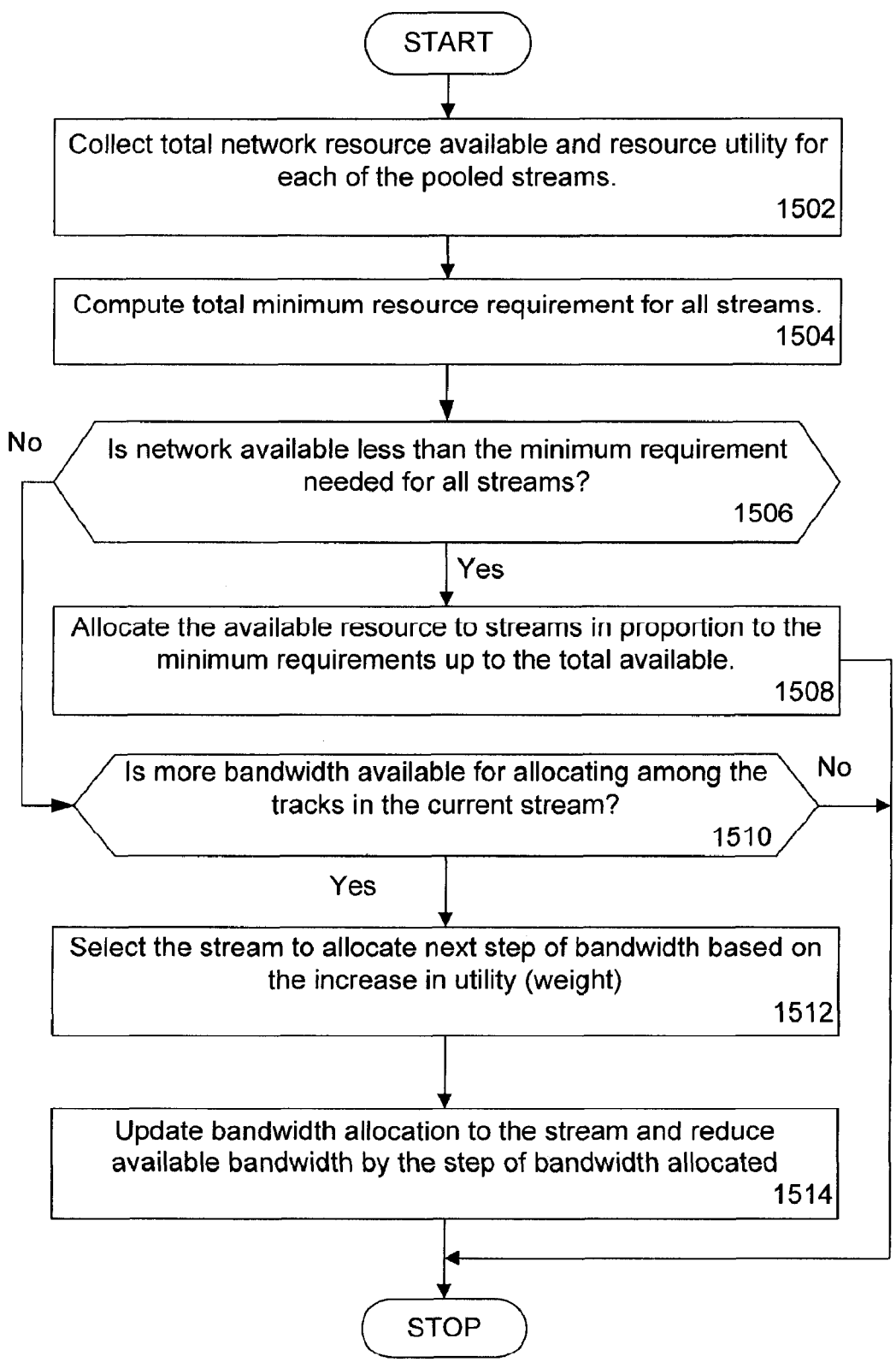
FIG. 15 is a flow diagram of the operations performed by the Network Allocation Module illustrated in FIG. 13.

FIG. 15 shows details of the Network Allocation Module processing. One of the ways to capture the relative priority between audio and video is to use utility values as an abstract mechanism to get information from the input content clip and/or each customization block. The utility is expressed as a relationship between the quality of content (in a scale of 1 to 100) with the bandwidth available. The utility is used to express requirements from content shaper modules and their impact on quality including priority of the stream, slope of the quality increase at a current predefined point, and bandwidth step size from the current predefined point to the next predefined point. Based on the information provided from the input content and/or the shapers for the streams available, the goal of the Network Allocation Module is to decide the resources available for each stream. The overall motivation is to evaluate the weighting of different shapers using the following equation, i.e. weight=priority of shaper*slope at current predefined point. A stream with maximum weighting is processed to increase by a step of bandwidth and then the illustrated steps are performed repeatedly until the total available bandwidth remaining goes to zero.

FIG. 15 shows that the first operation is to determine the total network resources that are available and to determine a resource utility for each of the pooled streams. This processing is represented by block 1502. Next, at block 1504, the total minimum resource requirement for each of the streams is determined. If the available network resources (e.g. bandwidth) are less than the minimum requirement for all the streams (that is, no stream can be accommodated), then at box 1506 the processing executes box 1508, where the available resources are allocated to streams in proportion to the minimum requirements, up to the total network resources available (e.g. bandwidth).

If the available network bandwidth is greater than the minimum requirement for each of the streams, an affirmative outcome at box 1506, then operations proceed to box 1510, where the Network Allocation Module checks to see if more bandwidth is available for allocation among the tracks in the current stream. If there is no more bandwidth available, a negative outcome at block 1510, then the module processing terminates for the current stream. If additional bandwidth is available, an affirmative outcome at block 1510, then operations proceed to block 1512, where the module selects the current stream to allocate the next step increase of bandwidth, based on the increase in utility gained. At block 1514, the module updates the bandwidth allocation to the current stream and reduces the available bandwidth by the step increase of bandwidth that was just allocated. The module processing then terminates for the current stream.

Returning to FIG. 14, in the next operation of system processing, at box 1406, the system customizes each track to maximize the received quality for the network resources as allocated. This operation involves determining an estimate of received clip quality for each track. Thus, the system will generate an estimate of received video quality for the video track of the clip, for a variety of compression parameters. At box 1408, the system composes the multi-media content using the customized tracks, in accordance with current network conditions to the receiving device. That is, the system (Content Customizer) determines network conditions for each receiving device that will receive the clip, and combines the available processed tracks, which were previously adapted for a variety of compression parameters by the Content Creator. The customized clip is transported to the receiving devices at box 1410.

The devices described above, including the Content Creator 102 and the Content Customizer 106 and the components providing the digital content 206 and prepped content 216, can be implemented in a wide variety of computing devices, so long as they can perform the functionality described herein. Such devices will typically operate under control of a computer central processor and will include user interface and input/output features. A display or monitor is typically included for communication of information relating to the device operation. Input and output functions are typically provided by a user keyboard or input panel and computer pointing devices, such as a computer mouse, as well as ports for device communications and data transfer connections. The ports may support connections such as USB or wireless communications. The data transfer connections may include printers, magnetic and optical disc drives (such as floppy, CD-ROM, and DVD-ROM), flash memory drives, USB connectors, 802.11-compliant connections, and the like. The data transfer connections can be useful for receiving program instructions on program product media such as floppy disks and optical disc drives, through which program instructions can be received and installed on the device to provide operation in accordance with the features described herein.

The present invention has been described above in terms of a presently preferred embodiment so that an understanding of the present invention can be conveyed. There are, however, many configurations for mobile enterprise data systems not specifically described herein but with which the present invention is applicable. The present invention should therefore not be seen as limited to the particular embodiments described herein, but rather, it should be understood that the present invention has wide applicability with respect to mobile enterprise data systems generally. All modifications, variations, or equivalent arrangements and implementations that are within the scope of the attached claims should therefore be considered within the scope of the invention.

We claim:

1. A method of processing digital content for network transport, the method comprising:
    processing a digital content clip having multiple constituent tracks, to produce prepped content that is stored at a network data store,
    wherein the processing comprises: for each frame in each constituent track that represents video, creating in advance of the network transport a pool of encoded frames versions comprising for each original frame at least (A) a first I-frame encoded at a first quantization level; (B) a second I-frame encoded at a second quantization level; (C) a first P-frame encoded at a first quantization level and for a first frame-rate; (D) a second P-frame encoded at a second quantization level and for a second frame-rate;
    in response to a request, received from a remote device, for the digital content clip, performing:
    (a) determining bandwidth availability between the network data store and the remote device and apportioning available bandwidth among the multiple constituent tracks of the digital content clip;
    (b) determining packet drop rate (PDR) between the network data store and the remote device;
    (c) at the time of network transport, selecting on a frame-by-frame basis an optimal combination of encoded frame versions from said pool of previously-encoded frame versions based on the determined bandwidth availability and the determined PDR; and
    (d) dynamically composing a customized stream for network transport from the network data store to the remote device.

2. The method according to claim 1, wherein processing a digital content clip comprises:
    selecting one of the multiple constituent tracks, the selected constituent track comprising a media type, for processing;
    producing a processed version of the selected constituent track; and
    repeating the selecting of one of the multiple constituent tracks and the producing for any remaining constituent tracks of the digital content clip, thereby producing the prepped content for each constituent track independently of the other constituent tracks comprising the digital content clip.

3. The method according to claim 1, wherein selecting constituent tracks from the prepped content comprises allocating available network resources between the constituent tracks of the digital content clip.

4. The method according to claim 3, wherein allocating available network resources comprises apportioning available bandwidth among the multiple constituent tracks of the digital content clip.

5. The method according to claim 4, wherein apportioning available bandwidth comprises:
    determining total network resources available for network transport for each constituent track of the digital content clip;
    computing total minimum resource requirement for all of the constituent tracks;
    allocating the determined total network resources available among the constituent tracks in a predetermined proportion, in response to the total network resources available being less than the computed total minimum resource requirement, and otherwise repeatedly allocating an increased portion of the total network resources available to a constituent track according to a selected track that provides a greater reduction in required network resources for transport.

6. The method according to claim 1, wherein selecting from the prepped content for a portion of the digital content clip comprises selecting video frames such that at least two from the set comprising frame rate, frame type, and frame compression level are not unchanged through the portion of the digital content clip.

7. The method according to claim 1, further including:
    determining the composition of the constituent tracks by analysis of the constituent tracks of the digital content clip.

8. The method according to claim 1, wherein processing a digital content clip includes:
    converting a constituent track to a base composition;
    determining options for the base composition of the constituent track; and
    determining a combination of compression parameters selected from the available processing parameters for the constituent track that will produce a prepped content version of the constituent track for a target network utilization.

9. The method according to claim 8, wherein the target network utilization is a function of resource scenario.

10. The method according to claim 9, wherein the resource scenario includes network condition between the network data store and the receiving device comprising bandwidth range and packet drop rate.

11. The method according to claim 9, wherein the resource scenario includes receiving device capabilities.

12. The method according to claim 8, wherein the converted constituent track is a video media type track and the base composition comprises a base video frame rate.

13. The method according to claim 8, wherein the converted constituent track is an audio media type track and the base composition comprises a base audio sampling rate.

14. The method according to claim 1, wherein one of the multiple constituent tracks is a video media type track that comprises video frames, and the compression parameters include multiple levels of compression, multiple video frame types, and multiple video frame rates.

15. The method according to claim 14, wherein the prepped content comprises multiple sets of frames such that at least one of the available combinations of compression level, video frame type, and frame rate is excluded.

16. The method according to claim 1, wherein the constituent tracks includes at least two tracks from the group of media types including video, audio, closed caption, and second audio program (SAP).

17. The method according to claim 16, further including:
    processing each of the constituent tracks with a corresponding adaptation module to produce a processed version of the corresponding constituent track such that the processed constituent track requires a reduced network bandwidth for transport.

18. A computer system for processing digital content for network transport, the computer system comprising:
    a network communication interface through which the computer communicates with the network:
    a Content Creation Module in the computer that processes a digital content clip having multiple constituent tracks to produce prepped content, wherein, for each frame in each constituent track that represents video, the Content Creation Module creates in advance of the network transport a pool of encoded frames versions comprising for each original frame at least (A) a first I-frame encoded at a first quantization level; (B) a second I-frame encoded at a second quantization level; (C) a first P-frame encoded at a first quantization level and for a first frame-rate; (D) a second P-frame encoded at a second quantization level and for a second frame-rate;

wherein the Content Creation Module stores the prepped content at a network data store, a Content Customizer Module in the computer that responds to a request from a remote device for the digital content clip by (a) determining bandwidth availability between the network data store and the remote device and apportioning available bandwidth among the multiple constituent tracks of the digital content clip;

(b) determining packet drop rate (PDR) between the network data store and the remote device;

(c) at the time of network transport, selecting on a frame-by-frame basis an optimal combination of encoded frame versions from said pool of previously-encoded frame versions based on the determined bandwidth availability and the determined PDR; and (d) dynamically composing a customized stream for network transport from the network data store to the remote device.

19. The system according to claim 18, wherein the Content Creator Module selects one of the multiple constituent tracks comprising a media type for processing and produces a processed version of the selected constituent track, and repeats the selecting of one of the multiple constituent tracks and the producing for any remaining constituent tracks of the digital content clip, thereby producing the prepped content an for each constituent track independently of the other constituent tracks comprising the digital content clip.

20. The system according to claim 18, wherein the Content Customizer Module selects constituent tracks from the prepped content by allocating available network resources between the constituent tracks of the digital content clip.

21. The system according to claim 20, wherein the Content Customizer Module allocates available network resources by apportioning available bandwidth among the multiple constituent tracks of the digital content clip.

22. The system according to claim 21, wherein the Content Customizer Module includes a Network Allocation Module that apportions available bandwidth by determining total network resources available for network transport for each constituent track of the digital content clip, computing total minimum resource requirement for all of the constituent tracks, and allocating the determined total network resources available among the constituent tracks in a predetermined proportion, in response to the total network resources available being less than the computed total minimum resource requirement, and otherwise repeatedly allocating an increased portion of the total network resources available to a constituent track according to a selected track that provides a greater reduction in required network resources for transport.

23. The system according to claim 18, where the Content Customizer Module selects from the prepped content for a portion of the digital content clip by selecting video frames such that at least two from the set comprising frame rate, frame type, and frame compression level are not unchanged through the portion of the digital content clip.

24. The system according to claim 18, wherein the Content Creator Module determines the composition of the constituent tracks by analysis of the constituent tracks of the digital content clip.

25. The system according to claim 18, wherein the Content Creator Module processes a constituent track of the digital content clip by converting the constituent track to a base composition, determining options for the base composition of the constituent track, and determining a combination of compression parameters selected from the available processing parameters for the constituent track that will produce an adapted version of the constituent track for a target network utilization.

26. The system according to claim 25, wherein the target network utilization is a function of resource scenario.

27. The system according to claim 26, wherein the resource scenario includes network condition between the network data store and the receiving device comprising bandwidth range and packet drop rate.

28. The system according to claim 26, wherein the resource scenario includes receiving device capabilities.

29. The system according to claim 25, wherein the converted constituent track is a video media type track and the base composition comprises a base video frame rate.

30. The system according to claim 25, wherein the converted constituent track is an audio media type track and the base composition comprises a base audio sampling rate.

31. The system according to claim 18, wherein one of the multiple constituent tracks is a video media type track that comprises video frames, and the compression parameters include multiple levels of compression, multiple video frame types, and multiple video frame rates.

32. The system according to claim 31, wherein the prepped content comprises multiple sets of frames such that at least one of the available combinations of compression level, video frame type, and frame rate is excluded.

33. The system according to claim 18, wherein the constituent tracks includes at least two tracks from the group of media types including video, audio, closed caption, and second audio program (SAP).

34. The system according to claim 33, further including:
a corresponding adaptation module for each of the group media types of the constituent tracks, wherein each corresponding adaptation module is configured to produce a processed version of the corresponding constituent track such that the processed constituent track requires a reduced network bandwidth for transport.

35. A program product for use in a computer system that executes program instructions recorded in a non-transitory computer readable media to perform a method for processing digital content for network transport, the program product comprising:
a non-transitory recordable media;
a program of computer-readable instructions executable by the computer system to perform operations comprising:
processing a digital content clip having multiple constituent tracks, each constituent track representing a different media type, to produce prepped content that is stored at a network data store,
wherein the processing comprises: for each frame in each constituent track that represents video, creating in advance of the network transport a pool of encoded frames versions comprising for each original frame at least (A) a first I-frame encoded at a first quantization level; (B) a second I-frame encoded at a second quantization level; (C) a first P-frame encoded at a first quantization level and for a first frame-rate; (D) a second P-frame encoded at a second quantization level and for a second frame-rate;

in response to a request, received from a remote device, for the digital content clip, performing:

(a) determining bandwidth availability between the network data store and the remote device and apportioning available bandwidth among the multiple constituent tracks of the digital content clip;

(b) determining packet drop rate (PDR) between the network data store and the remote device;

(c) at the time of network transport, selecting on a frame-by-frame basis an optimal combination of encoded frame versions from said pool of previously-encoded frame versions based on the determined bandwidth availability and the determined PDR; and (d) dynamically composing a customized stream for network transport from the network data store to the remote device.

36. The program product according to claim 35, wherein processing a digital content clip comprises:

selecting one of the multiple constituent tracks, the selected constituent track comprising a media type, for processing;

producing a processed version of the selected constituent track; and repeating the selecting of one of the multiple constituent tracks and the producing for any remaining constituent tracks of the digital content clip, thereby producing the prepped content for each constituent track independently of the other constituent tracks comprising the digital content clip.

37. The program product according to claim 35, wherein selecting constituent tracks from the prepped content comprises allocating available network resources between the constituent tracks of the digital content clip.

38. The program product according to claim 37, wherein allocating available network resources comprises apportioning available bandwidth among the multiple constituent tracks of the digital content clip.

39. The program product according to claim 38, wherein apportioning available bandwidth comprises:

determining total network resources available for network transport for each constituent track of the digital content clip;

computing total minimum resource requirement for all of the constituent tracks;

allocating the determined total network resources available among the constituent tracks in a predetermined proportion, in response to the total network resources available being less than the computed total minimum resource requirement, and otherwise repeatedly allocating an increased portion of the total network resources available to a constituent track according to a selected track that provides a greater reduction in required network resources for transport.

40. The program product according to claim 35, wherein selecting from the prepped content for a portion of the digital content clip comprises selecting video frames such that at least two from the set comprising frame rate, frame type, and frame compression level are not unchanged through the portion of the digital content clip.

41. The program product according to claim 35, further including:

determining the composition of the constituent tracks by analysis of the constituent tracks of the digital content clip.

42. The program product according to claim 35, wherein processing a digital content clip includes:

converting a constituent track to a base composition;

determining options for the base composition of the constituent track; and determining a combination of compression parameters selected from the available processing parameters for the constituent track that will produce a prepped content version of the constituent track for a target network utilization.

43. The program product according to claim 42, wherein the target network utilization is a function of resource scenario.

44. The program product according to claim 43, wherein the resource scenario includes network condition between the network data store and the receiving device comprising bandwidth range and packet drop rate.

45. The program product according to claim 43, wherein the resource scenario includes receiving device capabilities.

46. The program product according to claim 42, wherein the converted constituent track is a video media type track and the base composition comprises a base video frame rate.

47. The program product according to claim 42, wherein the converted constituent track is an audio media type track and the base composition comprises a base audio sampling rate.

48. The program product according to claim 35, wherein one of the multiple constituent tracks is a video media type track that comprises video frames, and the compression parameters include multiple levels of compression, multiple video frame types, and multiple video frame rates.

49. The program product according to claim 48, wherein the prepped content comprises multiple sets of frames such that at least one of the available combinations of compression level, video frame type, and frame rate is excluded.

50. The program product according to claim 35, wherein the constituent tracks includes at least two tracks from the group of media types including video, audio, closed caption, and second audio program (SAP).

51. The program product according to claim 50, further including:

processing each of the constituent tracks with a corresponding adaptation module to produce a processed version of the corresponding constituent track such that the processed constituent track requires a reduced network bandwidth for transport.

52. The method according to claim 1, wherein the subset of available processing parameters for a particular constituent track includes processing parameters associated with the media type of the particular constituent track.

53. The system according to claim 18, wherein the subset of available processing parameters for a particular constituent track includes processing parameters associated with the media type of the particular constituent track.

54. The program product according to claim 35, wherein the subset of available processing parameters for a particular constituent track includes processing parameters associated with the media type of the particular constituent track.

55. The method according to claim 1, wherein one of the multiple media types comprises video having frames, and independently combining selected constituent tracks comprises selecting the video media type on a frame-by-frame basis.

56. The system according to claim 18, wherein one of the multiple media types comprises video having frames, and the Content Customizer Module performs independently combining selected constituent tracks by selecting the video media type on a frame-by-frame basis.

57. The program product according to claim 35, wherein one of the multiple media types comprises video having frames, and independently combining selected constituent tracks comprises selecting the video media type on a frame-by-frame basis.

* * * * *